United States Patent
Witkin et al.

(10) Patent No.: US 10,163,243 B2
(45) Date of Patent: Dec. 25, 2018

(54) SIMULATION OF HAIR IN A DISTRIBUTED COMPUTING ENVIRONMENT

(71) Applicant: Pixar, Emeryville, CA (US)

(72) Inventors: Andrew P. Witkin, Oakland, CA (US); John Anderson, San Anselmo, CA (US); Lena Petrovic, Union City, CA (US)

(73) Assignee: Pixar, Emeryville, CA (US)

( * ) Notice: Subject to any disclaimer, the term of this patent is extended or adjusted under 35 U.S.C. 154(b) by 102 days.

(21) Appl. No.: 14/802,534

(22) Filed: Jul. 17, 2015

(65) Prior Publication Data

US 2015/0325030 A1    Nov. 12, 2015

Related U.S. Application Data

(62) Division of application No. 12/717,540, filed on Mar. 4, 2010, now Pat. No. 9,098,944.

(51) Int. Cl.
| | |
|---|---|
| *G06T 13/00* | (2011.01) |
| *G06T 13/40* | (2011.01) |
| *G06T 19/00* | (2011.01) |
| *G06T 11/20* | (2006.01) |
| *G06T 17/00* | (2006.01) |

(52) U.S. Cl.
CPC ............ G06T 13/40 (2013.01); G06T 11/203 (2013.01); G06T 17/00 (2013.01); G06T 19/00 (2013.01); *G06T 2210/21* (2013.01); *G06T 2219/2016* (2013.01)

(58) Field of Classification Search
CPC ......... G06T 13/00; G06T 13/20; G06T 13/40; G06T 13/60

USPC .................................................. 345/473–475
See application file for complete search history.

(56) References Cited

U.S. PATENT DOCUMENTS

| | | | |
|---|---|---|---|
| 6,370,565 B1 * | 4/2002 | Van Gong | A63F 13/12 709/205 |
| 6,720,962 B1 | 4/2004 | Alter | |
| 6,952,218 B1 | 10/2005 | Bruderlin | |
| 8,026,917 B1 | 9/2011 | Rogers et al. | |
| 8,698,810 B2 | 4/2014 | Witkin et al. | |
| 9,098,944 B2 | 8/2015 | Witkin et al. | |
| 2004/0080506 A1 | 4/2004 | Mech | |

(Continued)

FOREIGN PATENT DOCUMENTS

| | | |
|---|---|---|
| GB | 2478431 | 8/2015 |
| NZ | 591410 | 7/2012 |

OTHER PUBLICATIONS

Plante et al., "Capturing the Complexity of Hair Motion", 2002, Graphical Models, vol. 64, pp. 40-58.*

(Continued)

*Primary Examiner* — Phong Nguyen
(74) *Attorney, Agent, or Firm* — Kilpatrick Townsend & Stockton LLP

(57) ABSTRACT

Techniques are disclosed for accounting for features of computer-generated dynamic or simulation models being at different scales. Some examples of dynamic or simulation models may include models representing hair, fur, strings, vines, tails, or the like. In various embodiments, features at different scales in a complex dynamic or simulation model can be treated differently when rendered and/or simulated.

20 Claims, 17 Drawing Sheets

(56) References Cited

U.S. PATENT DOCUMENTS

| | | | | |
|---|---|---|---|---|
| 2005/0012741 | A1* | 1/2005 | Chen | G06T 15/00 345/419 |
| 2005/0075557 | A1* | 4/2005 | Kamiyama | A63F 13/10 600/407 |
| 2005/0212800 | A1* | 9/2005 | Petrovic | G06T 13/40 345/426 |
| 2006/0149516 | A1* | 7/2006 | Bond | A63F 13/10 703/6 |
| 2007/0030266 | A1 | 2/2007 | Styles | |
| 2007/0085851 | A1 | 4/2007 | Muller et al. | |
| 2007/0216701 | A1 | 9/2007 | Bruderlin et al. | |
| 2007/0260668 | A1* | 11/2007 | Chen | H04L 67/32 709/201 |
| 2007/0262987 | A1* | 11/2007 | Ahn | G06T 17/00 345/424 |
| 2007/0268288 | A1* | 11/2007 | Duriez | G06F 17/5018 345/420 |
| 2007/0270092 | A1 | 11/2007 | Gornowicz et al. | |
| 2007/0273705 | A1 | 11/2007 | Bruderlin et al. | |
| 2007/0279413 | A1 | 12/2007 | Leveque et al. | |
| 2008/0170069 | A1* | 7/2008 | Gibbs | G06T 17/30 345/419 |
| 2008/0170080 | A1* | 7/2008 | Ishiwata | G06T 1/20 345/502 |
| 2008/0234990 | A1* | 9/2008 | Bowers | G06F 19/701 703/1 |
| 2008/0243452 | A1* | 10/2008 | Bowers | G06F 19/701 703/2 |
| 2008/0297519 | A1 | 12/2008 | Scapel et al. | |
| 2009/0091575 | A1* | 4/2009 | Borac | G06T 13/40 345/474 |
| 2009/0153551 | A1 | 6/2009 | Park et al. | |
| 2009/0326888 | A1* | 12/2009 | Bader | G06F 9/5061 703/6 |
| 2010/0156902 | A1 | 6/2010 | Kim et al. | |
| 2010/0275212 | A1* | 10/2010 | Saha | G06F 9/5027 718/104 |
| 2010/0277475 | A1* | 11/2010 | McAdams | G06T 13/40 345/420 |
| 2010/0329162 | A1* | 12/2010 | Kadous | H04W 72/1215 370/310 |
| 2011/0004827 | A1* | 1/2011 | Doerr | H04L 67/36 715/735 |
| 2011/0040533 | A1* | 2/2011 | Torrens | E21B 44/00 703/2 |
| 2011/0216070 | A1 | 9/2011 | Witkin et al. | |
| 2011/0216074 | A1 | 9/2011 | Witkin et al. | |
| 2014/0022267 | A1* | 1/2014 | Rajagopal | G06T 1/20 345/522 |

OTHER PUBLICATIONS

U.S. Appl. No. 13/756,793, "Non-Final Office Action", dated Feb. 24, 2016, 18 pages.
GB1103772.8, "Office Action", dated Apr. 27, 2015, 2 pages.
GB1103773.6, "Office Action", dated Mar. 24, 2015, 2 pages.
GB1103773.6, "Office Action", dated Jul. 4, 2014, 3 pages.
U.S. Appl. No. 13/756,793, "Notice of Allowance", dated Jun. 21, 2016, 5 pages.
Examination Report under Section 18(3) from the UK Intellectual Property Office, dated Sep. 28, 2015, for United Kingdom Patent Application No. BG1103772.8, 4 pages.
Chen, A Spatial low-pass filter working for triangulat irregular network (TIN) and restricted by break lines, 1989.
Selle, A. et al., "A Mass Spring Model for hair simulation", ACM Trans. Graph., (Aug. 2008), 27, 3, Article 64.
Examination Report under Section 18(3), dated Apr. 29, 2015, for UK Patent Application No. GB1103772.8, filed Mar. 4, 2011, 2 pages.
Examination Report, dated Oct. 29, 2014, for UK Patent Application No. GB1103772.8, filed Mar. 4, 2011, 2 pages.
Search Report, dated Jun. 22, 2011, or UK Patent Application No. GB1103772.8, filed Mar. 4, 2011, 5 pages.
Non-Final Rejection, dated Apr. 6, 2015, for U.S. Appl. No. 13/756,793, filed Feb. 1, 2013, 19 pages.
Notice of Allowance, dated Mar. 27, 2015, for U.S. Appl. No. 12/717,540, filed Mar. 4, 2010, 8 pages.
Final Rejection, dated May 29, 2014, for U.S. Appl. No. 12/717,540, filed Mar. 4, 2010, 16 pages.
Non-Final Rejection, dated Oct. 23, 2013, for U.S. Appl. No. 12/717,540, filed Mar. 4, 2010, 14 pages.
Final Rejection, dated Mar. 15, 2013, for U.S. Appl. No. 12/717,540, filed Mar. 4, 2010, 14 pages.
Non-Final Rejection, dated Sep. 14, 2012, for U.S. Appl. No. 12/717,540, filed Mar. 4, 2010, 15 pages.
Iben, et. al., U.S. Appl. No. 13/756,793, filed Feb. 1, 2013.
Notice of Allowance, dated Dec. 2, 2013, for U.S. Appl. No. 12/717,530, filed Mar. 4, 2010, 23 pages.
Final Rejection, dated Apr. 5, 2013, for U.S. Appl. No. 12/717,530, filed Mar. 4, 2010, 15 pages.
Non-Final Rejection, dated Oct. 4, 2012, for U.S. Appl. No. 12/717,530, filed Mar. 4, 2010, 13 pages.
Final Rejection, dated Nov. 16, 2015, for U.S. Appl. No. 13/756,793, filed Feb. 1, 2013, 20 pages.
Decision to Grant, dated Nov. 3, 2015, for United Kingdom Application No. GB1103772.8, 2 pages.
Bando, Y., Chen, B.-Y., and Nishita, T. "Animating hair with loosely connected particles", Computer Graphics Forum, (Sep. 2003).vol. 22; No. 3.
Bergou, M., Wardetzky, M., Robinson, S., Audoly, B., and Grinspun, E., "Discrete elastic rods", in ACM SIGGRAPH Papers, (2008), vol. 63; No. 12.
Bergou, M., Audoly, B., Vouga, E., Wardetzky, M., and Grinspun, E., "Discrete viscous threads", In ACM SIGGRAPH papers, (2010), vol. 116: No. 10.
Bertails, F., Audoly, B., Cani, M.-P., Querleux, B., Leroy, F., and Leveque, J.-L., "Super-helices for predicting the dynamics of natural hair", in ACM SIGGRAPH papers, (2006), pp. 1180-1187.
Bertails, F., Hadap, S., Cani, M.-P., Lin, M., Kim, T.-Y., Marschner, S., Ward, K., and Kacic-Alesic , Z., "Realistic hair simulation: animation and rendering", in ACM SIGGRAPH 2008 classes, SIGGRAPH, (May 19, 2008), vol. 89: No. 154.
Chang, J. T., Jin, J., and Yu, Y., "A practical model for hair mutual interactions", In Proc. of the 2002 ACM SIGGRAPH/Eurographics symposium on Computer Animation, pp. 73-80.
Choe, B., Choi, M. G., and Ko, H.-S., "Simulating complex hair with robust collision handling", In Proc. of the 2005 ACM SIGGRAPH/Eurographics symposium on Computer Animation, (Jul. 29-31, 2005), pp. 153-160.
Grégoire, M., and E. Schömer, "Interactive simulation of one-dimensional flexible parts", In Proc. of the 2006 ACM symposium on Solid and Physical Modeling, (Mar. 21, 2007), pp. 95-103.
Gupta, R., Montagnol, M., Volino, P., and Magnenat-Thalmann, N., "Optimized framework for real time hair simulation", In Proc. of Computer Graphics International (CGI 2006), LNCS, pp. 702-710.
McAdams, A., Selle, A., Ward, K., Sifakis, E., and Teran, J., "Detail preserving continuum simulation of straight hair", In ACM SIGGRAPH papers, (2009), 62:1-62:6.
Pai, D. K., "Strands: Interactive simulation of thin solids using cosserat models", Computer Graphics Forum (Sep.), vol. 21; No. 3, pp. 347-352.
Petrovic, L., Henne, M., and Anderson, J., "Volumetric methods for simulation and rendering of hair", Technical Memo 06-08, (2005), Pixar Animation Studios, 6 pages.
Plante, E., Cani, M.-P., and Poulin, P., "Capturing the complexity of hair motion", Graphical Models, (Jan. 2002), vol. 64, No. 1, pp. 40-58.
Rosenblum, R., Carlson, W. E., and Tripp III, E., "Simulating the structure and dynamics of human hair: Modelling, rendering and animation", The Journal of Visualization and Computer Animation, (Jun. 1991), vol. 2, pp. 141-148.
Spillmann, J., and Teschner, M., "CoRdE: Cosserat rod elements for the Dynamic Simulation of One-Dimensional elastic objects", In

(56) References Cited

OTHER PUBLICATIONS

Proc. of the 2007 ACM SIGGRAPH/Eurographics symposium on Computer Animation, (2007), pp. 63-72.

Teschner, M., Heidelberger, B., Mueller, M., Pomeranets, D., and Gross, M., "Optimized spatial hashing for collision detection of deformable objects", In Vision, Modeling and Visualization, (Nov. 19-21, 2003), 47-54.

Ward, K., Bertails, F., Kim, T.-Y., Marschner, S. R., Cani, M.-P., and Lin, M. C., "A survey on hair modeling: Styling, simulation, and rendering", IEEE Transactions on Visualization and Computer Graphics, (Mar. 2007), vol. 13: No. 2, pp. 213-234.

\* cited by examiner

SIMULATION OF HAIR IN A DISTRIBUTED COMPUTING ENVIRONMENT

CROSS-REFERENCES TO RELATED APPLICATIONS

This application is a divisional of application Ser. No. 12/717,540, filed Mar. 4, 2010, entitled "Scale Separation in Hair Dynamics," which is hereby incorporated by reference for all purposes.

BACKGROUND OF THE INVENTION

This disclosure relates to computer-generated imagery (CGI) and computer-aided animation. More specifically, this disclosure relates to scale separation in hair dynamics and other techniques used in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images is the can be the balancing of a desire for a highly-detailed image of a character or other object with the practical issues involved in allocating the resources (both human and computational) required to produce those visually appealing images.

Accordingly, what is desired is to solve one or more of the problems relating to simulations of hair and fur for use in CGI and computer-aided animation, some of which may be discussed herein. Additionally, what is desired is to reduce some of the drawbacks relating to simulations of hair and fur for use in CGI and computer-aided animation, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be present some innovations, embodiments, and/or examples found within this disclosure in a simplified form as a prelude to a more detailed description presented later.

Techniques are disclosed for accounting for features of computer-generated dynamic or simulation models being at different scales. Some examples of dynamic or simulation models may include models representing hair, fur, strings, vines, tails, or the like. In various embodiments, features at different scales in a complex dynamic or simulation model can be treated differently when rendered and/or simulated.

In one embodiment, a method for separating scale in computer-generated dynamic or simulation models may be performed by one or more computer systems using information specifying a first pose of a dynamic or simulation model and information specifying a second pose of the dynamic or simulation model. A difference may be determined between the first and second pose of curve model. The difference between the first and second pose of curve model then may be decomposed into a plurality of scale separations. The decomposition process may involve the use of one or more filtering operations. In one aspect, the difference may be decomposed into a plurality of scale separations for dynamic properties or properties used for simulation.

In one embodiment, each of the plurality of scale separations may be weighted or otherwise stored in association with a weighting value. Interaction responses, such as the influence of one or more forces, may be determined based on the weighted plurality of scale separations that move the second pose of the curve model toward the first pose of the curve model. One or more forces influenced by the weighted plurality of scale separations may be applied or represented to move the second pose of the curve model toward the first pose of the curve model.

In further embodiments, techniques are provided simplifying handling of bulk properties in a distributed computing environment. In one embodiment, a method for handling of bulk properties in a distributed computing environment may be performed by one or more computer systems using information specifying a reference pose for each of a plurality of dynamic or simulation models. Interaction eligibility can be determined for parts of a simulation in the distributed computing environment of the plurality of dynamic or simulation models based on the reference pose of each of the plurality of dynamic or simulation models. The interaction eligibility may be determined based on a positional difference between the reference pose of each dynamic or simulation model in a first set of dynamic or simulation models in the plurality of dynamic or simulation models and the reference pose of each dynamic or simulation model in a second set of dynamic or simulation models in the plurality of dynamic or simulation models. The interaction eligibility may be determined based on a likelihood that a first set of curve models in the plurality of dynamic or simulation models will interact with a second set of curve models in the plurality of dynamic or simulation models.

In various embodiments, information specifying processor assignments in the distributed computing environment may be generated based on the interaction eligibility. In some aspects, collisions may be detected based on the interaction eligibility.

In still further embodiments, techniques are provided for the interactive designing of computer-generated hair models. In one embodiment, a method for designing of computer-generated hair models may be performed by one or more computer systems. First information may be generated that is configured to display a hair style of a computer-generated hair model within one or more user interfaces associated with a simulation-assisted hair modeling environment. A series of changes can be provided via the one or more user interfaces. Each change in the series of changes may provide or author modifications to the hair style of the computer-generated hair model. In response to each change in the series of changes, simulation results corresponding to the authored change may be received and used to generate second information configured to display the hair style according to the simulations results corresponding to the authored change.

In one embodiment, a method for reducing communication of collision information between nodes in a distributed computing environment simulating a plurality of objects in response to motion of another object includes receiving, at a computer, a reference pose for each of the plurality of objects, Interaction eligibility is determined between each object in the plurality of objects using the reference pose for each of the plurality of objects. The plurality of objects are then partitioned into a plurality of groups according to the determined interaction eligibility between each object in the plurality of objects. Information is generated assigning each group in the plurality of groups to a node in the distributed computing environment.

Determining the interaction eligibility between each object in the plurality of objects using the reference pose for each of the plurality of objects can include determining a positional difference between the reference pose of a first object in the plurality objects and the reference pose of a second object in the plurality of objects. Determining the interaction eligibility between each object in the plurality of objects using the reference pose for each of the plurality of objects can include determining a physical relationship between the reference pose of a first object in the plurality objects and the reference pose of a second object in the plurality of objects. Determining the interaction eligibility between each object in the plurality of objects using the reference pose for each of the plurality of objects can include determining a proximity difference between the reference pose of a first object in the plurality objects and the reference pose of a second object in the plurality of objects.

A further understanding of the nature of and equivalents to the subject matter of this disclosure (as wells as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
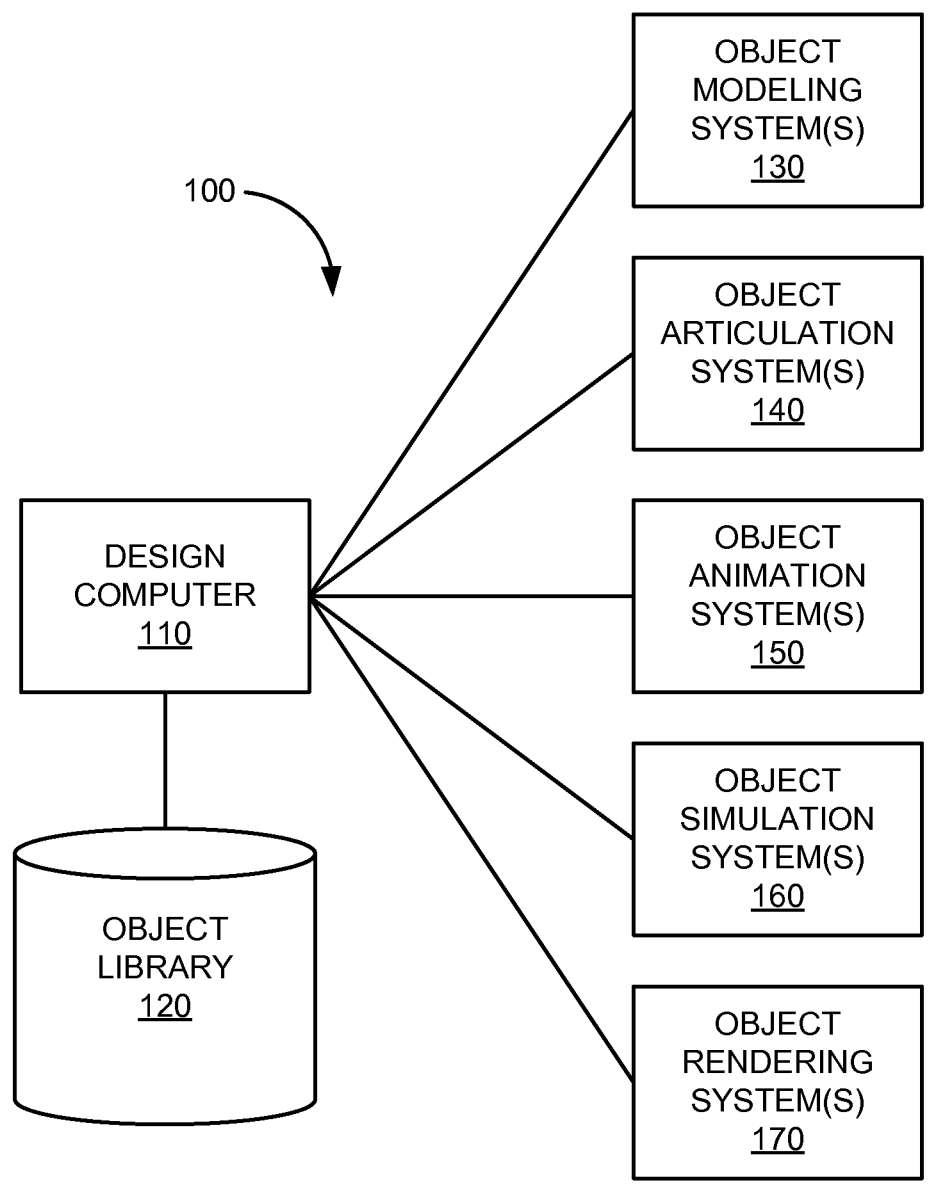
FIG. 1 is a simplified block diagram of a system for creating computer graphics imagery (CGI) and computer-aided animation that may implement or incorporate various embodiments or techniques for reorienting properties in hair dynamics.

FIG. 1 is a simplified block diagram of system 100 for creating computer graphics imagery (CGI) and computer-aided animation that may implement or incorporate various embodiments or techniques for implemented hair dynamics. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., images representing the motion and position of an object over time) for use by other elements of system 100 or that can be stored in object library 120. The one or more object rendering systems 170 may be configured to allow a user to associate additional information or metadata with all or a portion of the rendered image.

Filtered Torsion Springs

In some aspects, techniques may be incorporated into system 100 for orienting (or reorienting) properties of computer-generated models, such as those associated with dynamic models or simulation models. Some examples of dynamic or simulation models may include models representing hair, fur, strings, vines, tails, or the like. In various embodiments, properties (e.g., material or physical properties) that influence how a dynamic or simulation model (e.g., a complex curve model representing a curly hair) maintains its shape in one pose may be oriented or re-oriented as desired for other poses of the model using readily available reference frames. These references frame may be obtained using poses of a proxy model that corresponds to poses of a dynamic or simulation model. In some embodiments, a proxy model may include a smoothed version of a dynamic or simulation model. In other embodiments, a proxy model may include a filtered or simplified version of a dynamic or simulation model.

Traditionally, long curly hair is one of the most interesting and difficult materials to represent in computer graphics. Models used to represent hair generally have the common problem of being a 1-D object (e.g., a curve model) embedded in a 3-D world. Typically, hair can be modeled as an infinitely thin cylinder having no well defined reference at any given point.

Figure 2:
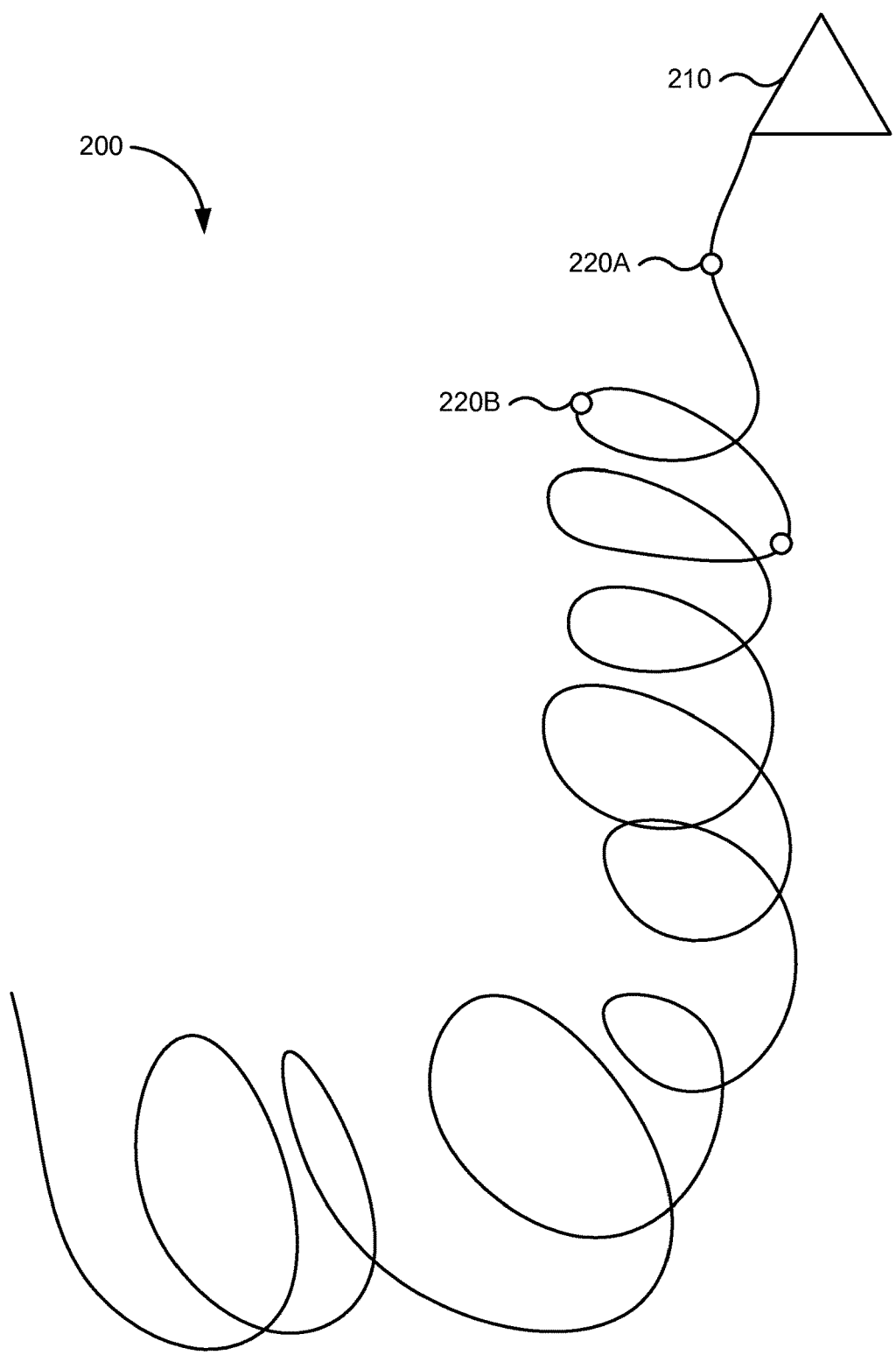
FIG. 2 is an illustration of a curve model that may be used for creating CGI and computer-aided animation in various embodiments.

FIG. 2 is an illustration of curve model 200 that may be used for creating CGI and computer-aided animation in various embodiments. In this example, curve model 200 is represented by a root hair node or vertex 210 and one or more control nodes or vertices 210 (e.g., vertices 220A and 220B). A user of design computer 110 may create a pose for curve model 200 based on the positions and orientations of root hair vertex 210 and control vertices 220.

In general, hair can be represented by a structure similar to curve model 200. Various properties may be associated with curve model 200 that provide a groom and "the look and feel" of hair. For example, dynamics of an individual hair can be represented by springs connecting point masses. These springs may be modeled on curve model 200 to resist stretching and twisting in a hair, thereby producing plausible motion of the hair. Additionally, properties placed on or otherwise associated with portions of curve model 200 may provide a hair style or groom, such as a lock of curly hair. These properties may oriented to represent the intrinsic bends, offsets, or rotations, in a curly hair.

Figure 3:
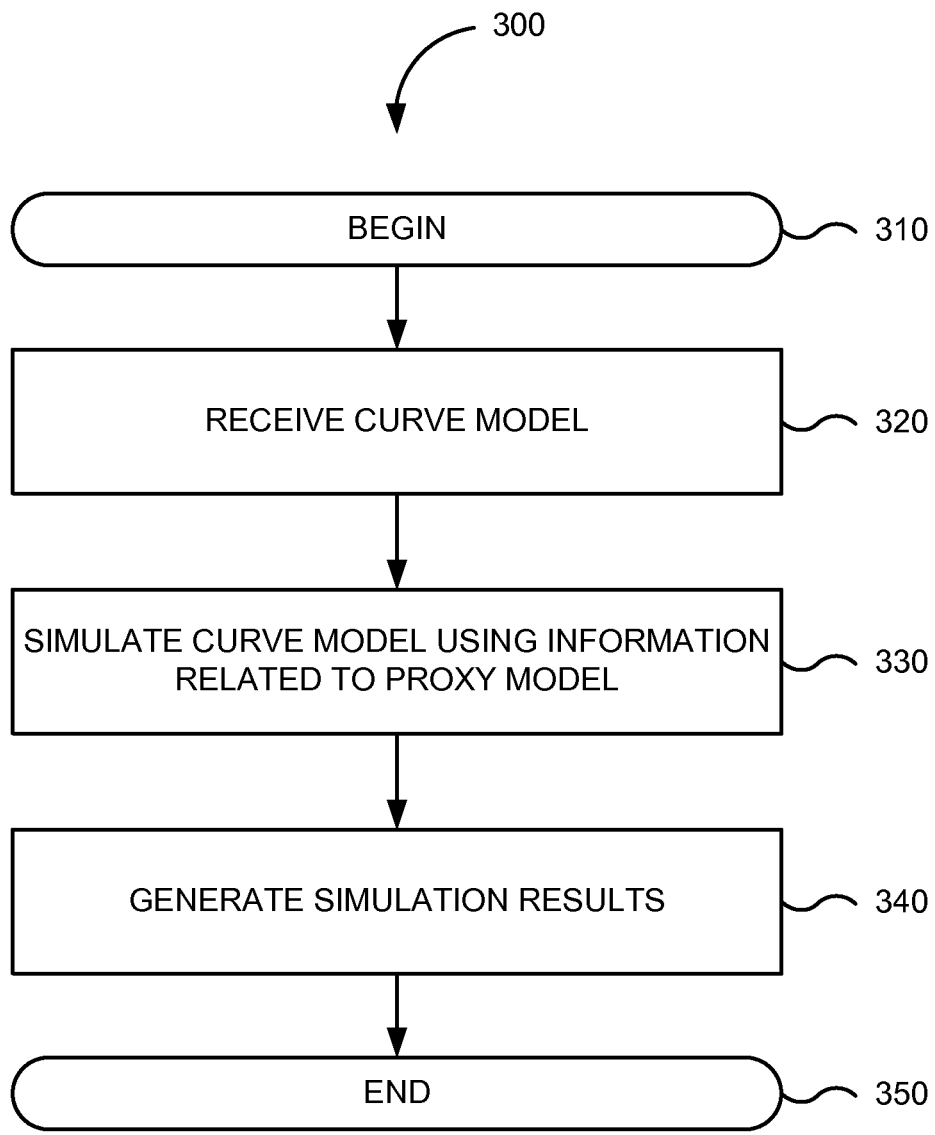
FIG. 3 is a simplified flowchart of a method for simulating a curve model using information related to a proxy model in various embodiments.

FIG. 3 is a simplified flowchart of method 300 simulating a curve model (e.g., curve model 200) using information related to a proxy model in various embodiments. The processing of method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, a curve model is received. For example, a user of design computer 110 may utilize the one or more object modeling systems 130 to create or sculpt curve model 200. Information specifying or defining curve model 200 may be provided by the user of design computer 110 of FIG. 1 or derived programmatically. Curve model 200 may include information defining the geometric description of a curve, topological information, control points, animation variables (avars), physical properties, material properties, lighting properties, or the like. Curve model 200 may also be associated with pose information, animation cues, or the like. For example, a modeler using design computer 110 may define a rest pose for curve model 200. The rest pose may be used to determine a shape or style all or part of curve model 200 seeks to maintain in light of a simulation. In another example, an animator using design computer 110 may define various additional poses for curve model 200. The various additional poses can specifying a desired position of control vertices 220A and 220B over time that can be used to create an animation of curve model 200.

In step 330, the curve model is simulated using information related to a proxy model. For example, a user of design computer 110 may utilize the one or more object simulation systems 160 to simulate curve model 200. The one or more object simulation systems 160 may simulate behavior and/or response of curve model 200 based on properties defining the shape of curve model 200 and other internal forces and external forces (e.g., gravity, wind, or collisions). The one or more object simulation systems 160 may also simulate behavior of additional curve models (e.g., additional hair or fur associated with curve model 200) that are controlled or influenced by curve model 200.

Behavior and/or response of curve model 200 during a simulation may require information from the structure of curve model 200. The structure of curve model 200 typically can provide its shape and other material properties in addition to information from which a reference frame can be constructed. Local coordinate frames then may be provided along the length of curve model 200 that may be used for any hair deformation or for interaction responses, such as from physical forces, hair-to-hair or hair-to-body collisions, or the like. In one example, starting at root hair vertex 210, a local coordinate frame can be computed with a coordinate frame fixed with respect to the object to which root hair vertex 210 is attached. The X-axis may be determined to be along the hair direction. This coordinate frame can then be propagated along curve model 200 between successive control vertices 220 (e.g., between control vertices 220A and 220B). Thus, a suitable local coordinate frame may be determined at each of desired points along curve model 200, such as at each of control vertices 220. These local coordinate frames may be used in essence account for any change in hair direction between two consecutive vertices due to properties of curve model 200, such as mechanical and physical properties of a hair that provide its shape and/or groom.

However, dynamic or simulation models, such as complex hair styles or hair exhibiting complex physical properties such as long curly hair, may require a large number of control vertices to provide a desired structure, shape, and/or groom. As a result of having a large number of control vertices or large datasets to represent the complex material or physical properties of curly hair, it may become computationally prohibitive to use an approach of propagating information along a curve between successive control vertices to determine local coordinate frames. Additionally, it may become potentially numerically unstable to manage the large datasets in production systems.

Accordingly, in various embodiments, information related to a proxy model may be used. For example, rendering and/or simulation of a complex curly hair model may be provided with stable reference frames for determining response. In one embodiment, a proxy version of curve model 200 may be used as a reference during the actual simulation of the curve model method 300 of FIG. 3. Simplified can be understood to mean that one or more features or complexities have been removed or that resolution of a model has been reduced. The simplified version of a dynamic or simulation model may be referred to as a proxy model.

In step 340, simulation results are generated. For example, the one or more object simulation systems 160 may generate simulation data based on dynamics associated with curve model 200. These dynamics may include material and physical properties associated with curve model 200, properties representing forces that move a pose of curve model 200 toward a rest pose of curve model 200, or the like. These dynamics may further include a groom or hairstyle properties. The one or more object simulation systems 160 may generate simulation data based an expected behavior of curve model 200 to additionally influences, such as those represented by forces (e.g., gravity or wind) and collisions (e.g., with itself or other objects). The one or more object simulation systems 160 may also generate the simulation data based on interpolating between different poses of curve model 200 and accounting for application of the above-described forces. FIG. 3 ends in step 350.

Figure 4:
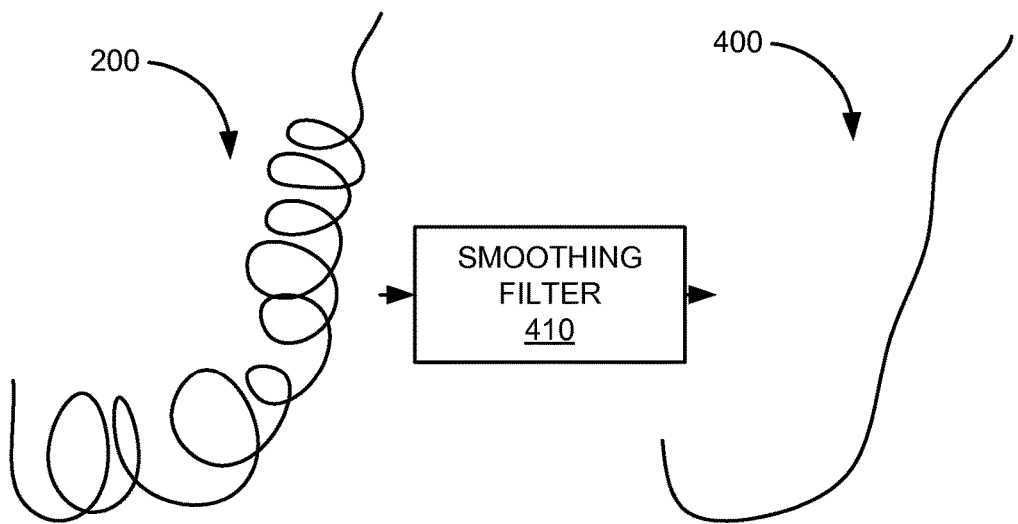
FIG. 4 is an illustration of one example of generating a proxy model corresponding to a curve model.

FIG. 4 is an illustration of one example of generating a proxy model corresponding to curve model 200. In this example, proxy model 400 is created or generated by applying smoothing filter 410 to curve model 200. Smoothing filter 410 can include one or more processes or techniques for reducing complexity of curve model 200. Smoothing filter 410 may reduce complexity by removing or reducing geometry, topology, properties, or other information associated with curve model 200. Smoothing filter 410 may be applied locally, globally, at a macro level, or a micro level.

Figure 5:
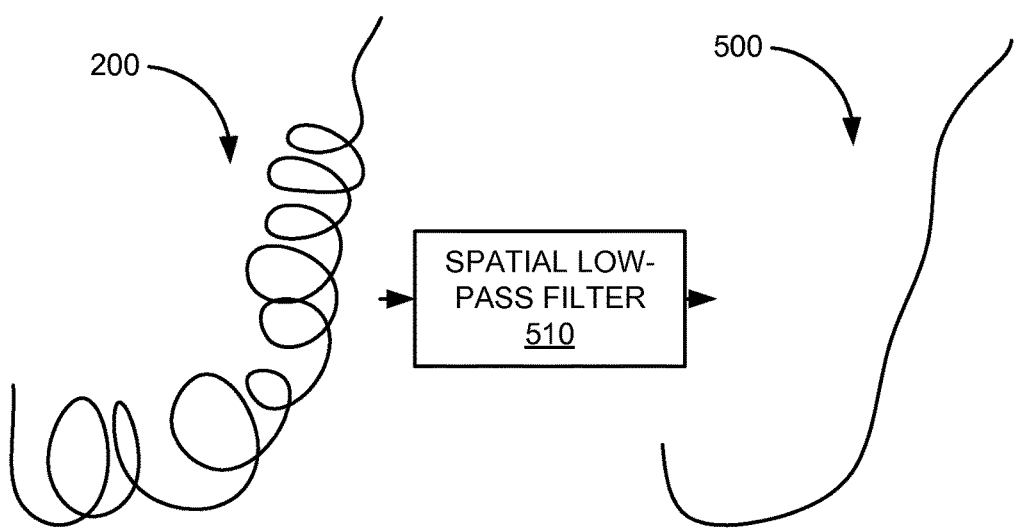
FIG. 5 is an illustration of another example of generating a proxy model corresponding to a curve model.

FIG. 5 is an illustration of another example of generating a proxy model corresponding to curve model 200. In this example, proxy model 500 is created or generated by applying spatial low-pass filter 510 to curve model 200. Spatial low-pass filter 510 can include one or more processes or techniques for reducing spatial complexity of curve model 200. Other types of filters or smoothing operations that generate a simplified version of curve model 200 may be contemplated that preserve a predetermined level of information that enable the resulting proxy model to serve as a reference for curve model 200 during simulation, such as infinite response filters or the like.

Figure 6:
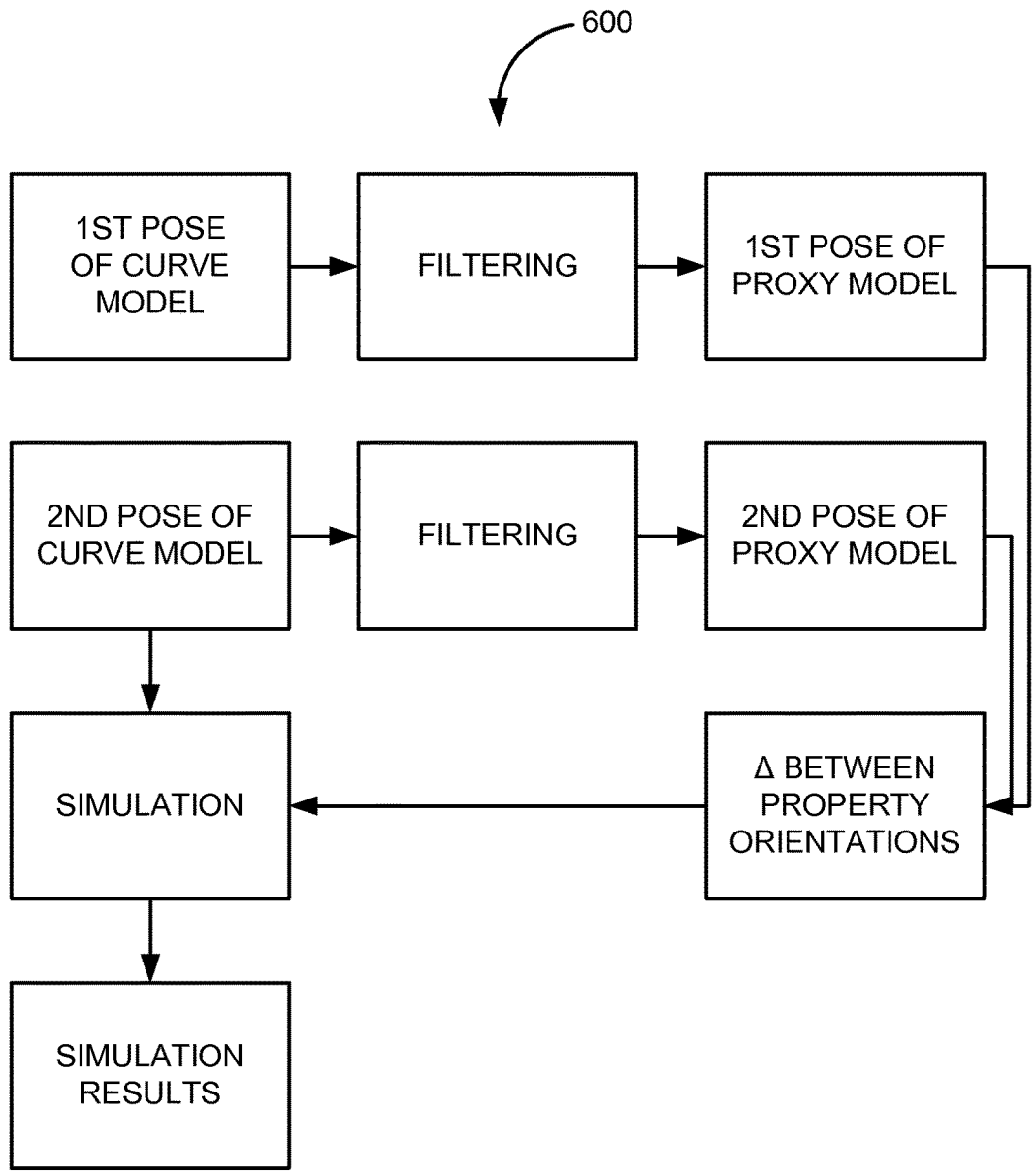
FIG. 6 is a block diagram illustrating data flow in a process for simulating a curve model using information related to a proxy model in various embodiments.

FIG. 6 is a block diagram illustrating data flow in process 600 for simulating a curve model using information related to a proxy model in various embodiments. In this example, design computer 110 receives a first pose of a curve model (e.g., curve model 200). The first pose of curve model 200 may correspond to or include a rest pose of curve model 200. The rest pose can include information describing how curve model 200 maintains its shape absent external influences. The first pose of curve model 200 may also correspond to any initial or other pose in which curve model 200 may be placed. The first pose of curve model 200 can be filtered to create or otherwise generate a first pose of a proxy model (e.g., proxy model 400 or proxy model 500). The first pose of proxy model 400 or 500 may correspond to or include a rest pose for proxy model 400. Similarly, the rest pose of proxy model 400 or 500 may correspond to a rest pose of curve model 200. The first pose of proxy model 400 or 500 may also correspond to any other pose in which proxy model 400 or 500 may be placed.

Additionally, design computer 110 receives a second pose of the curve model. The second pose of curve model 200 may include an initial pose of curve model 200. The second pose of curve model 200 may include the results of a previous simulation step or any other pose in which curve model 200 may be placed. The second pose of curve model 200 may likely be different from the first pose of curve model 200. The second pose of curve model 200 can be filtered to create or otherwise generate a second pose of the proxy model (e.g., proxy model 400 or proxy model 500). The second pose of proxy model 400 or 500 may correspond to or include any other pose in which proxy model 400 or 500 may be placed.

In various embodiments, one or more computer systems associated with system 100 may determine information relate to the proxy model (e.g., proxy model 400 or 500). The information may include a difference (or delta) between orientations of various properties based on the first and second poses of the proxy model. For example, a local coordinate frame may be determined at one point of the first pose of proxy model 400 and at a corresponding point of the second pose of proxy model 400. Account may be taken of any changes in orientation of various mechanical and/or physical properties at that point and later used during rendering and/or simulation of the curve model. Accordingly, in various aspects, instead of simulating proxy model 400 or 500 and imputing simulation results onto curve model 200, information related to proxy models 400 or 500 can provide references during the actual simulation of curve model 200 for determining how curve model 200 will maintain its shape in light of rest pose bend directions, intrinsic bend angles, rotation angles, offset vectors, or the like.

Figure 7:
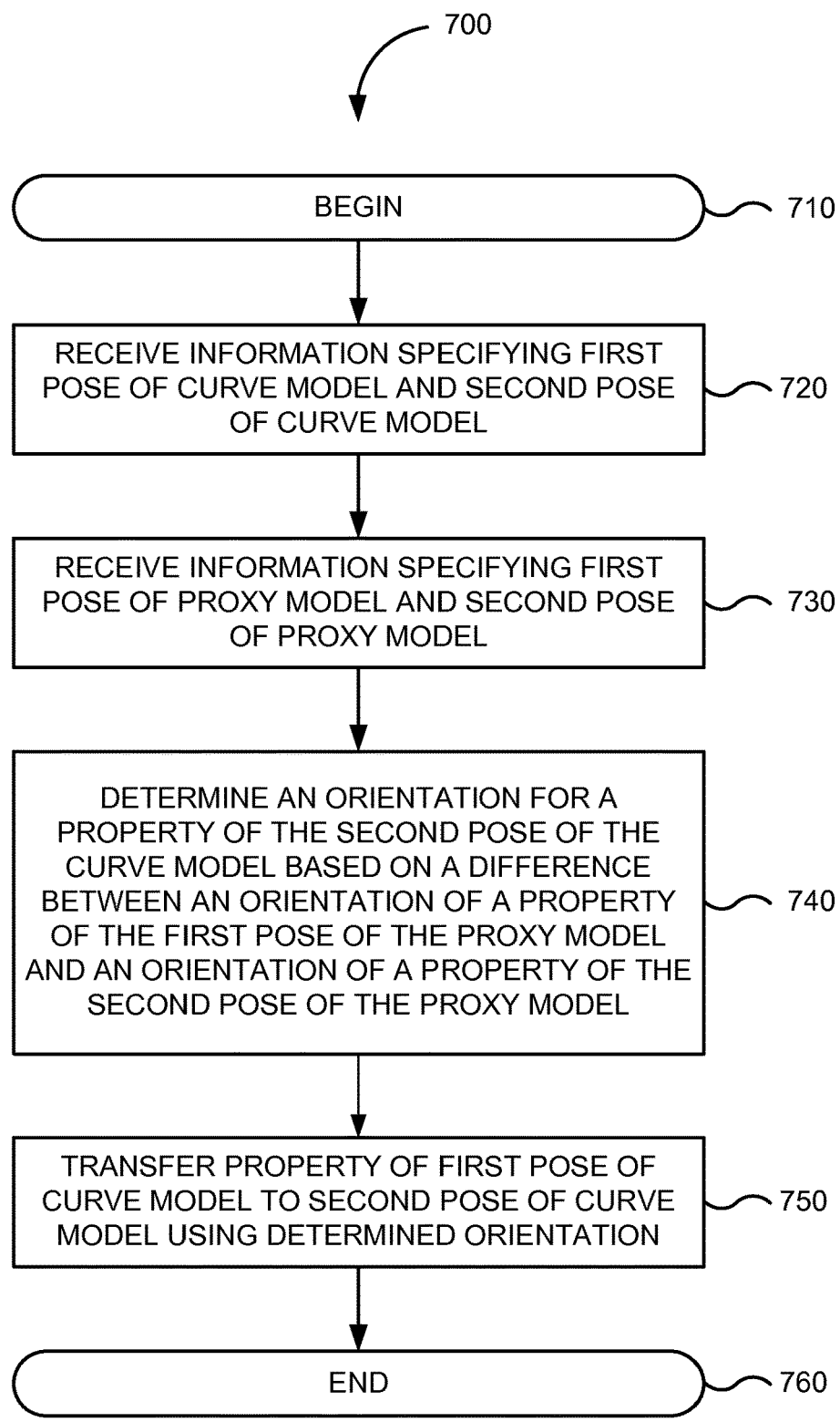
FIG. 7 is a flowchart of a method for reorienting properties in hair dynamics in various embodiments.

FIG. 7 is a flowchart of method 700 for reorienting properties in hair dynamics in various embodiments. The processing of method 700 depicted in FIG. 7 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 700 depicted in FIG. 7 begins in step 710.

In step 720, information specifying a first pose of a curve model and a second pose of a curve model is received. For example, a user of design computer 110 may provide a rest pose of curve model 200. In another example, a user of design computer 110 may provide an initial or additional pose of curve model 200. The curve model may be a dynamic or simulation model. Therefore, in yet another example, the second pose of curve model 200 may be the results of a previous simulation step.

In step 730, information specifying a first pose of a proxy model and a second pose of a proxy model is received. Using proxy model 500 as an example, the first pose of proxy model 500 may correspond to the rest pose of curve model 200, and thus be considered the rest pose of proxy model 500. The first pose of proxy model 500 may be generated manually be reducing complexity of curve model 200 in the first pose or procedurally using a smoothing filter, a spatial low-pass filter, or the like. The second pose of proxy model 500 may correspond to the initial or additional pose of curve model 200. The second pose of proxy model 500 may be generated manually be reducing complexity of curve model 200 in the second pose or procedurally using a smoothing filter, a spatial low-pass filter, or the like.

In step 740, an orientation for a property of the second pose of the curve model is determined based on a difference between an orientation of a property of the first pose of the proxy model and an orientation of a property of the second pose of the proxy model. As discussed above, a property may include bend directions, bend angles, rotation angles, offset vectors, and other non-scalar properties. In one example, the difference may include differences between bend directions, bend angles, rotation angles, offset vectors, and other scalar and non-scalar properties.

In step 750, a property of the first pose of the curve model is transferred to a second pose of the curve model using the determined orientation. For example, during simulation of curve model 200, orientation for properties of the second pose of curve model 200 are determined by reference to poses of proxy model 500. Differences between the orientations of the properties of different poses of proxy model 500 can be used to influence or determine the orientation of a property of the second pose of curve model 200. As a result, in some embodiments, this can reduce the need to propagate any large datasets defining a rich and complex shape of a curly hair represented by curve model 200 along curve model 200 during simulation that would be computational prohibitive and/or numerically unstable to a production process along with requiring additional expensive computing equipment. FIG. 7 ends in step 760.

Scale-Dependent Properties

In further aspects, dynamic or simulation models generally can include features implemented at a variety of scales to provide rich and realistic appearances. For example, strands of hair may include fine scale features (such as twists and turns of individual curls and locks) that may be found within or encompassed by larger scale features (such as the flexibility of the entire stand of hair). Accordingly, in various embodiments, system 100 may treat feature at different scales in dynamic or simulation models differently during rendering and/or simulation. In one embodiment, differences between poses of dynamic or simulation models can be decomposed into multiple scale separations. Each scale separation can be individually weighted to produce a desired effect or increase/reduce deformations of a particular scale feature.

Figure 8:
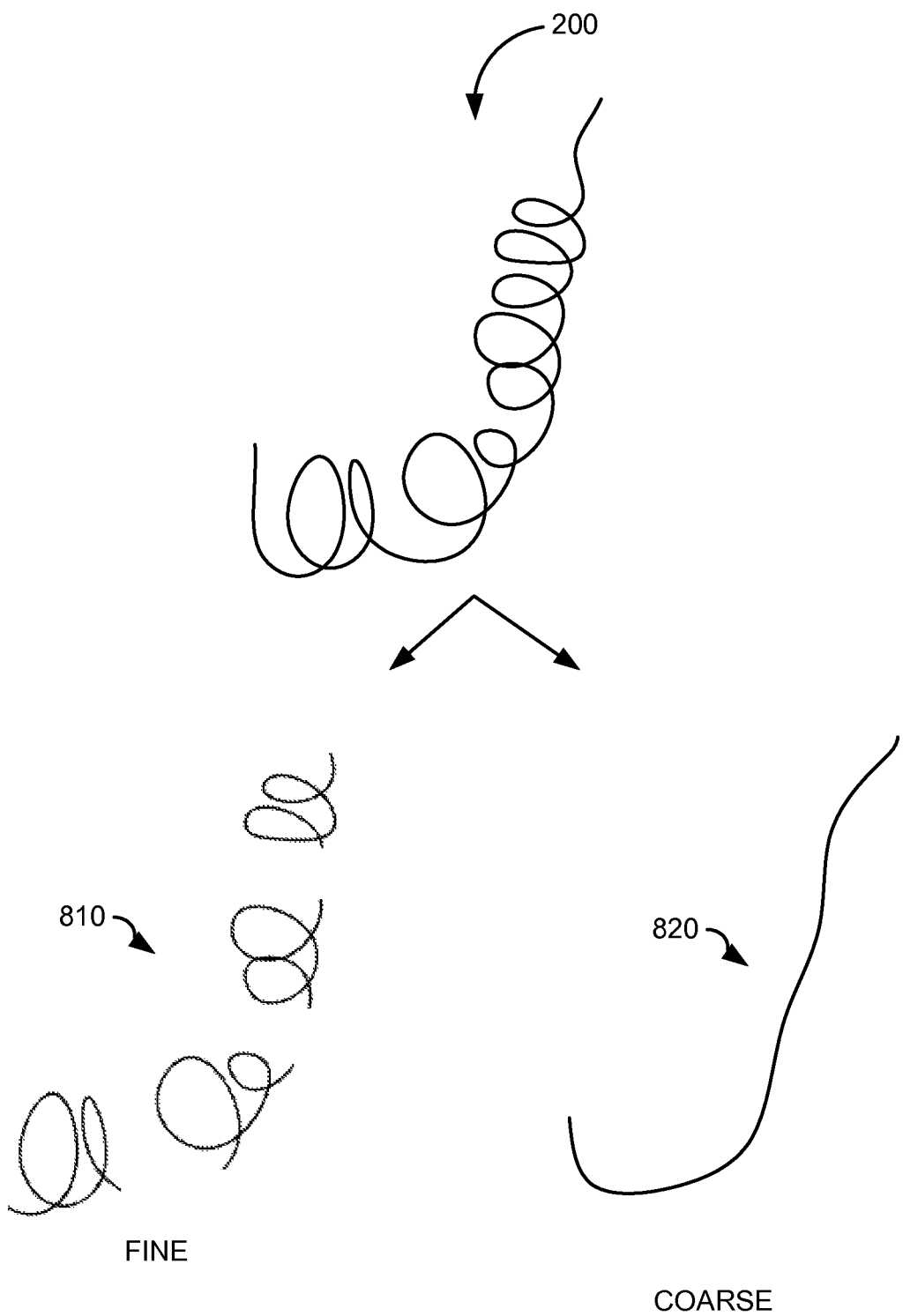
FIG. 8 is an illustration of the curve model of FIG. 2 having differently scaled features that may be used for creating CGI and computer-aided animation in various embodiments.

FIG. 8 is an illustration of curve model 200 of FIG. 2 having differently scaled features that may be used for creating CGI and computer-aided animation in various embodiments. In this example, curve model 200 representing an individual curly lock of hair can include fine feature 810 and coarse feature 820. Fine features 810 may include the twists, turn, bends, or the like, that affect the hair at each individual curly lock. Coarse features 820 of curve model 200 that may include the flexibility or bendability along the entire stand of hair. It may be desirable to have each individual curly lock in fine features 810 maintain its shape as closely as possible. However, this can cause the entire curve model 200 to act as if it had been create out of a steel wire rather than acting as real hair. Therefore, in various embodiments, fine features 810 can be weighted differently than coarse feature 820 such that individual curly locks maintain their shape while an entire strand of hair retains its flexibility or bendability.

Figure 9:
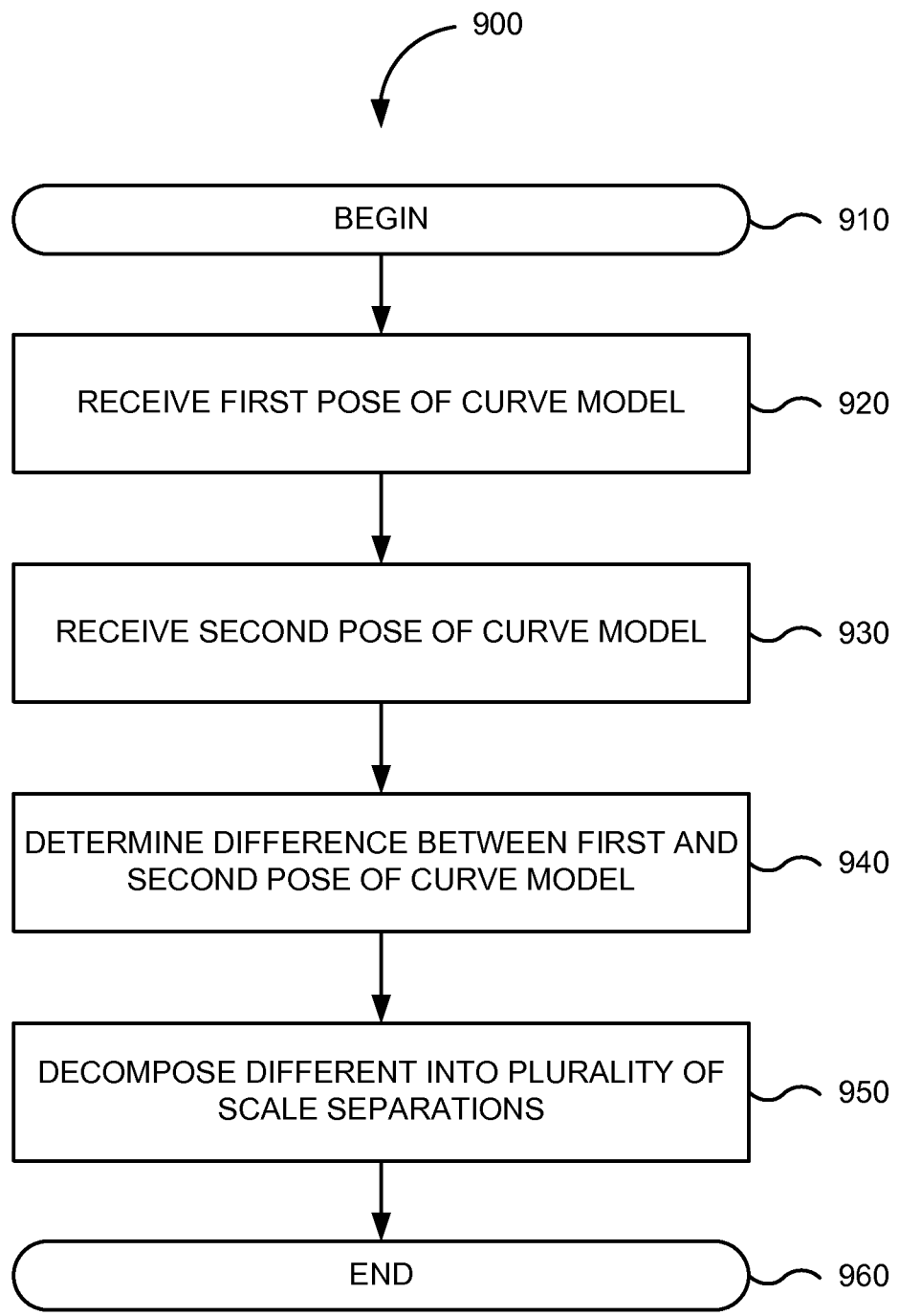
FIG. 9 is a flowchart of a method for scale separation in a curve model in various embodiments.

FIG. 9 is a flowchart of method 900 for scale separation in a curve model in various embodiments. The processing of method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In step 920, a first pose of a curve model is received. For example, a user of design computer 110 may specify a rest pose of curve model 200. As illustrated above, curve model 200 may include information that defines different scales of features.

In step 930, a second pose of the curve model is received. The second pose of the curve model may include an initial pose or any of a variety of poses that may be different from the first pose of the curve mode. For example, a user of design computer 110 may specify an initial pose of curve model 200 that is different from the rest pose.

In step 940, a difference between the first pose and the second pose of the curve model is determined. In step 950, the difference between the first pose and the second pose of the curve model is decomposed into a plurality of scale separations. Each scale separation in the plurality of scale separations differs by one or more predetermined or predefined criteria. For example, design computer 110 may decompose the difference between the rest pose of curve model 200 and the initial pose of curve model 200 into a scale separation for individual curls or locks of a hair represented by curve model 200 and another scale separation for the flexibility of the entire hair represented by curve model 200. FIG. 9 ends in step 960.

In various embodiments, features may be distinguished using one or more filters. A first filter may be used to determine a first set of features. A second filter may be used to determine a second set of features having complexity greater than the first set of features but not encompassing the first set of features. The second filter may be used to determine a second set of features that result in an output or apply an effect different from that resulting from or applied by the first set of features.

In further embodiment, the multiple scale separations may be used during rendering and/or simulating of curve model 200. For example, curve model 200 may have a certain rest deformation. The rest deformation can be indicative of the rest state or rest pose of curve model 200. Absent external influences, a simulation of curve model 200 would result in curve model 200 tending toward or remain in its rest state or rest pose. Thus, a simulation may apply one or more restoring forces based on a difference between a current deformation of curve model 200 and the rest pose of curve model 200 that move the current deformation of curve model 200 toward the rest pose of curve model 200.

In some embodiments, instead of determining and applying the one or more restoring force based on the raw differences between two deformation, multiple scale separations may be used to assign different magnitudes on the restoring forces for different scales. Accordingly, different scales may be treated differently to produce a desired effect or increase/reduce deformation of a particular scale feature.

Figure 10:
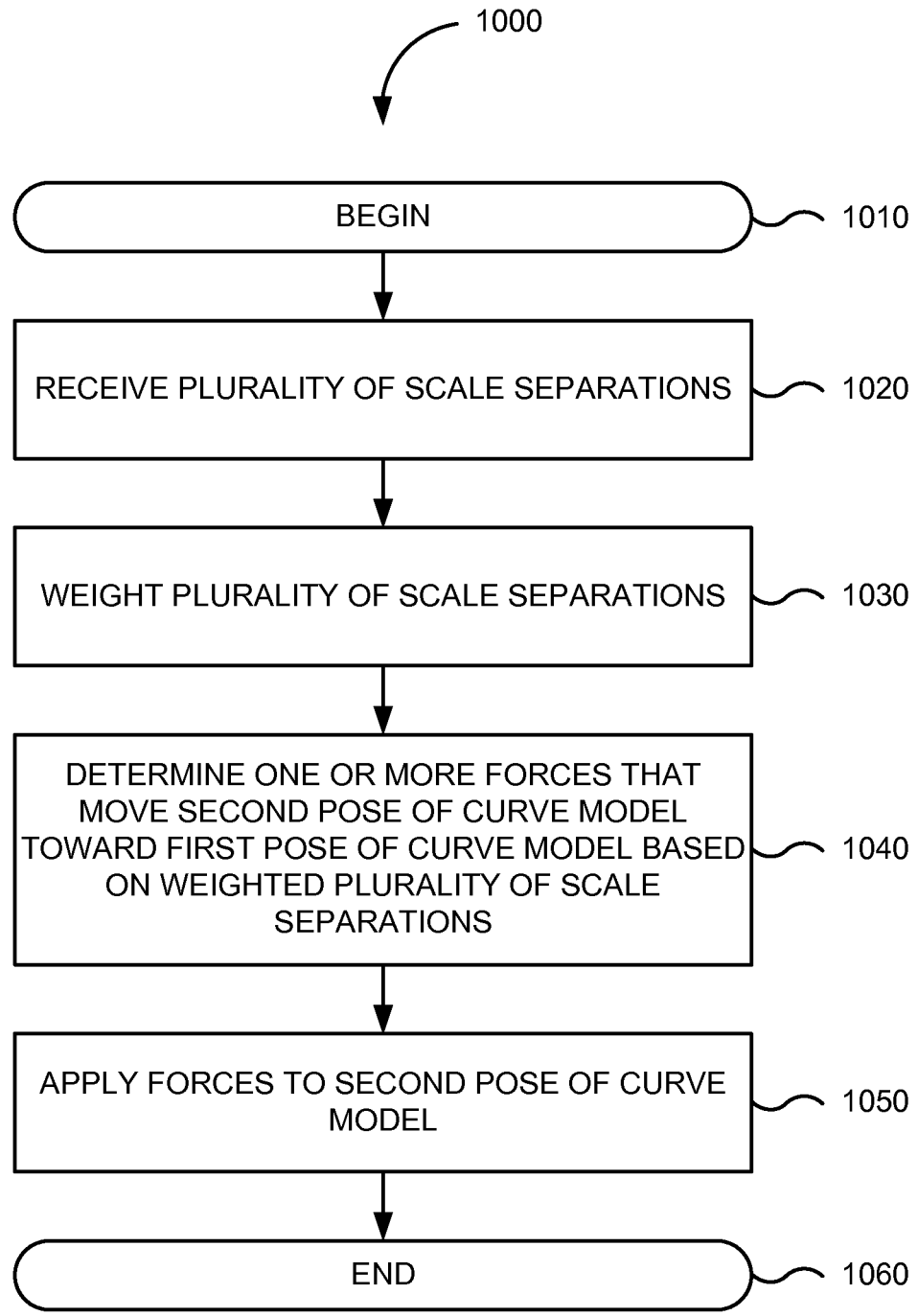
FIG. 10 is a flowchart of a method for applying forces using scale separation of a curve model in various embodiments.

FIG. 10 is a flowchart of method 1000 for applying forces using scale separation of a curve model in various embodiments. The processing of method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

In step 1020, a plurality of scale separations is received. The plurality of scale separations may be determined as discussed above with respect to FIG. 8.

In step 1030, each of the plurality of scale separations is weighted. For example, weighting of zero (0) for a give scale separation would change the magnitude of any restoring forces such that the restoring forces fail to affect or otherwise influence features associated with the given scale separation. In another example, a weighting greater than one (1) for a give scale separation would increase the magnitude of any restoring forces such that such that the restoring forces would have a greater effect or influence on features associated with the given scale separation. In yet another example, a weighting less than one (1) and greater than zero (0) for a give scale separation would reduce the magnitude of any restoring forces such that such that the restoring forces would have a lesser effect or influence on features associated with the given scale separation. A positive or negative weighting may be used to affect direction of any restoring forces.

In step 1040, one or more forces that move the second pose of the curve model toward the first pose of the curve model are determined based on weighted plurality of scale separations. In step 1050, the one or more determined forces are applied to the second pose of the curve model. FIG. 10 ends in step 1050.

Accordingly, different scales may be treated differently to produce a desired effect or increase/reduce deformation of a particular scale feature. For example, restoring forces applied to poses of curve model 200 may maintain as stiff finer scale features such as individual curly locks while also allowing flexibility in larger scale features along the entire hair represented by curve model 200. Thus, instead of determining and applying the one or more restoring force based on the raw differences between two deformation, multiple scale separations may be used to assign different magnitudes on the restoring forces for different scales.

Bulk Properties

In various embodiments, system 100 may incorporate techniques for assigning objects for simulation in a distributed computing environment. Due to a potentially large number of degrees of freedom, hair typically has been difficult to simulate. Often, only key hairs associated with a model may be simulated, while interpolation may be used to account for the rest of the hairs.

Figure 11:
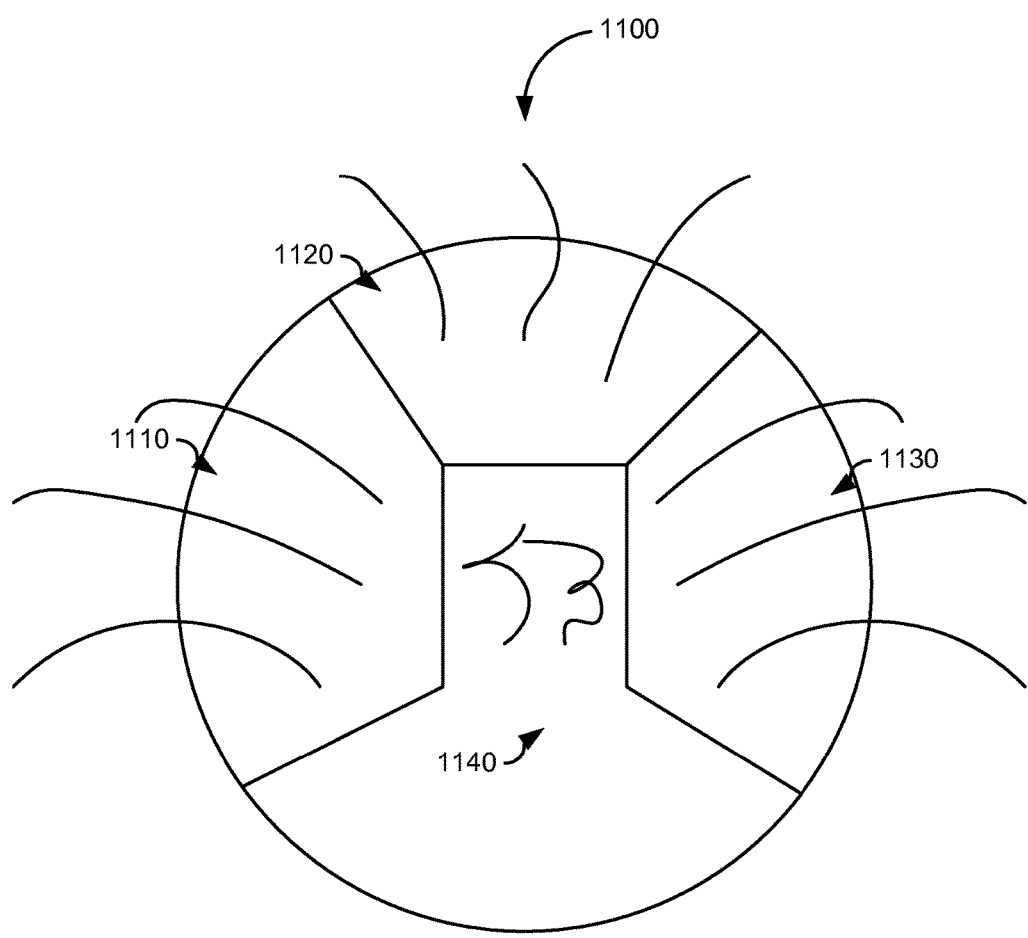
FIG. 11 is an illustration of a portion of a computer-generated model having a plurality of curve models that may be used for creating CGI and computer-aided animation in various embodiments.

FIG. 11 is an illustration of a portion (e.g., the scalp) of computer-generated model 1100 having a plurality of curve models that may be used for creating CGI and computer-aided animation in various embodiments. In this example, the plurality of curve models represent hairs on the scalp of the head of model 1100. The plurality of curve models may be attached to or otherwise associated with model 1100 and have a particular hairstyle or groom.

During simulation of the curve models in a distributed computing environment, the plurality of curve models that be represented by "sticks and balls" to determine response. In various aspects, dynamics of an individual key hair can be represented by springs connecting point masses. These springs may be modeled to produce plausible motion for a single hair by resisting stretching and twisting in the hair. In collisions with non-hair geometry, such as a character's scalp or body, a hair strand may be treated as a set of particles at the point mass positions. However, this may not account for hair-to-hair collisions, friction during simulation, and other bulk properties exhibited by real hair.

During simulation of the curve models in a distributed computing environment, each curve model in the plurality curve models may be randomly assigned to a processor in the environment. To account for hair-to-hair collisions, each processor may be required to send collision information to each and every other processor in the environment. Therefore, at each step of a simulation, as 20 thousand to 30 thousand particle collisions may be simulated, massive amounts of collision information may be communicated. In various embodiments, processor assignments may be made based on interaction eligibility between parts of a simulation. These processor assignments may reduce all or part of the collusion information that is needed to be communicated between one or more processors in the environment.

Figure 12:
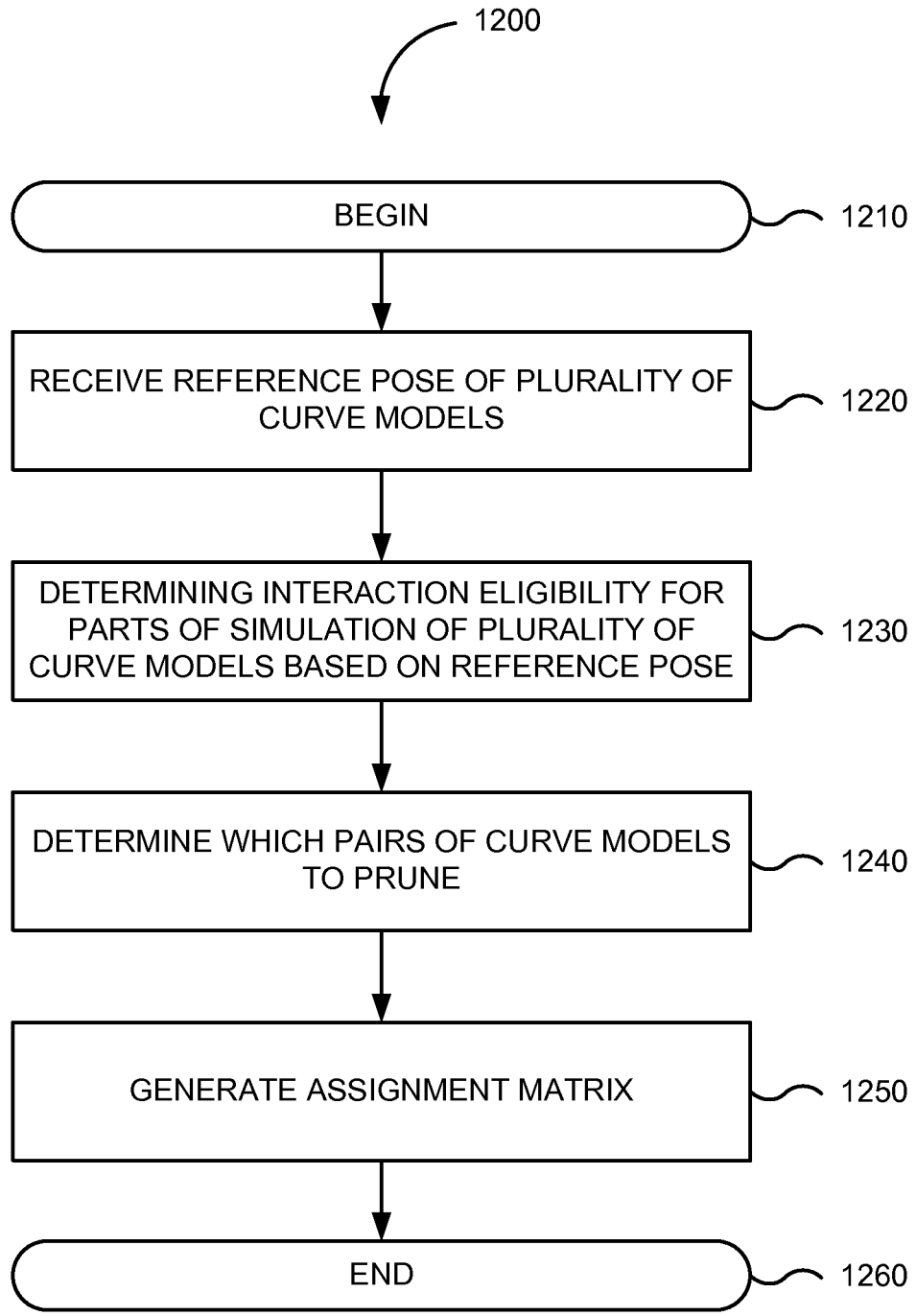
FIG. 12 is a flowchart of a method for processor assignment in a distributed computing environment for the plurality of curve models of FIG. 11 in various embodiments.

FIG. 12 is a flowchart of method 1200 for processor assignment in a distributed computing environment for the plurality of curve models of FIG. 11 in various embodiments. The processing of method 1200 depicted in FIG. 12 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1200 depicted in FIG. 12 begins in step 1210.

In step 1220, a reference pose of a plurality of curve models is received. For example, the reference pose may be any pose of model 1100. The reference pose may include a rest pose of model 1100 or any other pose of model 1100 selected as a reference pose.

In step 1230, interaction eligibility is determined for parts of a simulation of the plurality of curve models based on the reference pose. Interaction eligibility can include the likelihood that one object may interact with another object. Interaction eligibility can be determined based on relative or spatial proximity, distance, or other physical relationships. The parts of the simulation may include an single strand of hair, pairs of hairs, portions of the hair, a group or volume representation of hair, or the like.

In one example, the structure of a hair style or fur pattern may be analyzed to determine the likelihood of interactions between at least two hairs (e.g., a pair). Typically, hairs can have a fixed position relative to a character's body, such as a know placement of a hair root on a scalp of the character. In the example of FIG. 11, each of the plurality of curve models have a fixed position on a scalp associated with computer-generated object 1100. In general, relationships between two curve models in the plurality of curve models based on their fixed position are usually stable at the scalp while potentially deviating along the length of a hair (e.g., the comb-over). Therefore, in some embodiments, a plurality of curve models representing hair or fur may be partitions or sorted by their fixed position relative to a characters head or body. How pair of hairs are partitioned or sorted may be determine based on relative or spatial proximity, distance, physical relationships, or other criteria.

FIG. 11 illustrates the plurality of curve models sorted or partitioned into groups or sets 1110, 1120, 1130, and 1140. Curve models in groups or sets 1110, 1120, 1130, and 1140 have been determined likely to keep their spatial cohesion during simulation. Therefore, a curve model in set 1110 may be determined to be more likely to interact with another curve model in set 1110 and less likely to interact with curve models in the sets 1120, 1130, and 1140. Formation of sets 1110, 1120, 1130, and 1140 can be made based on relative or spatial proximity, distance, physical relationships, or other criteria between curve modes in the set of curve models. For example, sets 1110, 1120, 1130, and 1140 may be formed using curve models that are likely to interact based on their initial attachment to the scalp of object 1100.

In various embodiments, a determination may be made how sparsely to make assignments. For example, in step 1240, which pairs of curve models to prune is determined. Pruning may be performed to remove or reduce which objects another object is likely to interact with. Various selectable options or features may be provided to change how aggressively to prune. For example, a more aggressive prune may be utilized for a preview where a less aggressive prune is used for rendering.

In step 1250, an assignment matrix is generated. An assignment matrix can be used to define which objects are assigned to which processors in the distributed computing environment. The assignment matrix may include an indication of interaction eligibility between each of the plurality curve models. The assignment matrix can be generated in order to minimize communication based on the interaction eligibility determined in step 1230. FIG. 12 ends in step 1260.

Figure 13:
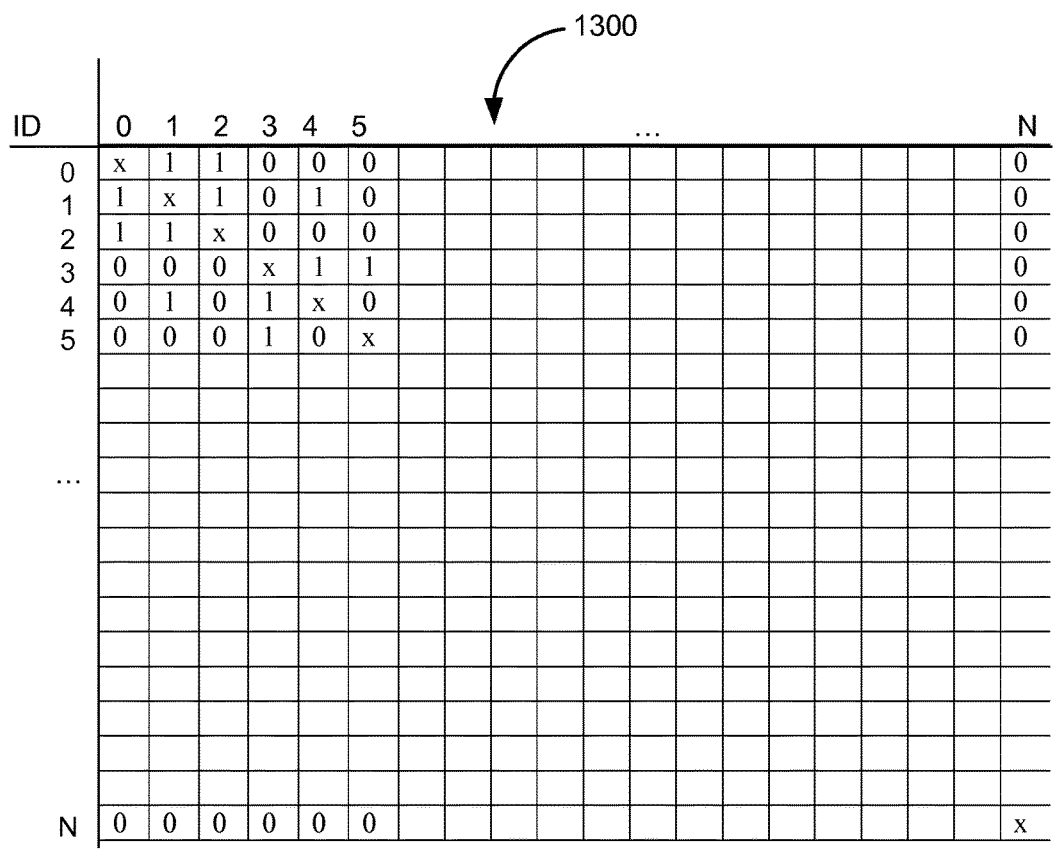
FIG. 13 is an exemplary assignment matrix for use in a distributed computing environment.

FIG. 13 is an exemplary assignment matrix 1300 for use in a distributed computing environment. In this example, assignment matrix 1300 can include identifiers for each hair to be simulated. The interaction eligibility between pairs of hairs (e.g., between a hair having the ID 1 and a hair having the ID 2 may be represented in assignment matrix 1300 as a binary value, a scalar quantity, a weight, or the like.

Figure 14:
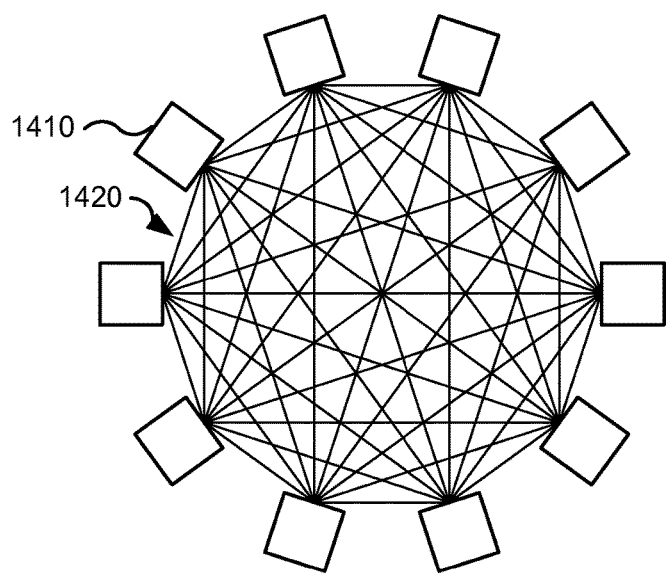
FIG. 14 is a block diagram illustrating collision communication in a distributed computing environment that may be reduced based on spatial cohesion in various embodiments.

FIG. 14 is a block diagram illustrating collision communication in a distributed computing environment that may be reduced based on spatial cohesion in various embodiments. The distributed computing environment can include a set of processors (e.g., represented by 10 boxes in a circle). A random assignment of hairs to processors can result in data being potentially communicated between each of the processors as illustrated. Assignment matrix 1300 may be used to assign hairs to processors to reduce or otherwise eliminate certain cross-processor communication of collision information.

As a result, in various embodiments, hairs (or portions of interest—e.g., curls or locks) can be partitioned among multiple processors in a way that reduces or otherwise eliminates communication between some or all of the processors. Accordingly, hairs on a character's scalp or body that may never likely come into contact with hairs on another portion of the character can be placed on different processors for simulation based on an assignment matrix. Hairs that have a likelihood of interacting can be assigned to a group of processor that will communicate just with each other rather than the entire processor pool.

Simulation-Assisted Modeling of Hair

During a production process, a designer using design computer 110 or traditional media typically draws or illustrates one or more pictures or images of a particular hair style for a character. A modeler using design computer 110 then may create one or more computer-generated models in an attempt to accurately represents the designer's vision of the particular hair style. Typically, this is an interactive process where the modeler sculpts the rest pose of a hair style in a series of changes to closely emulate the design. However, if the modeler is using dynamic or simulation models, this iterative process at arrive at the rest pose is often performed without seeing the effects of a simulation on the model. Once the model is simulated, the model often looks substantially different from the vision of the designer due to how material or physical properties of the hair style and physical parameters of the simulation.

Accordingly, in various embodiments, system 100 may include an interactive modeling environment that allows users of design computer 110 to develop a rest pose of a model visually under the influence of a simulator. A modeler using design computer 110 may, during an interactive process where the modeler sculpts the rest pose of a hair style, visually see the results of one or more simulations as changes are made to the model.

Figure 15:
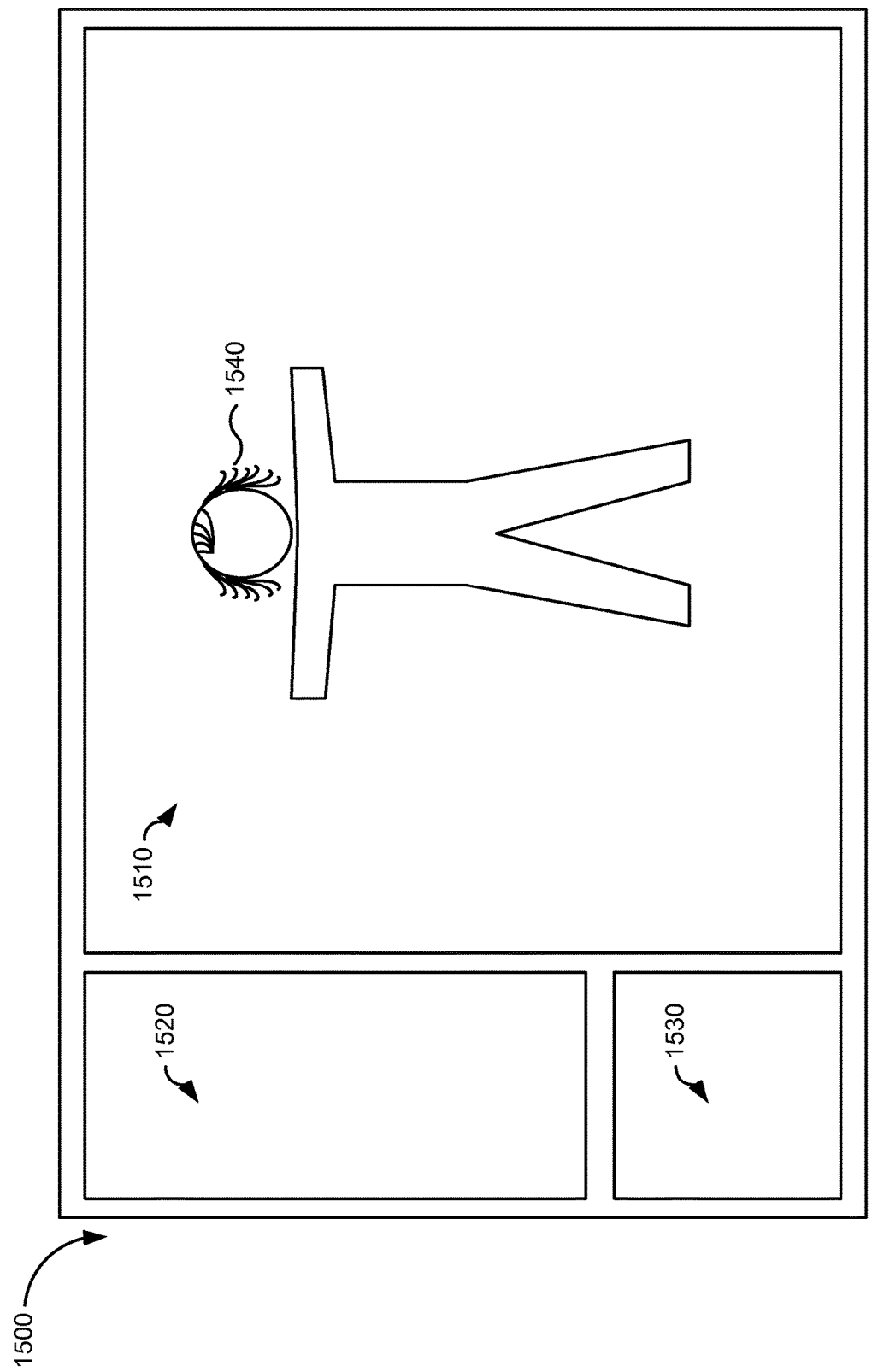
FIG. 15 is an illustration depicting an interactive environment user interface where simulation is an integral part of hair style design.

FIG. 15 is an illustration depicting interactive environment user interface 1500 where simulation is an integral part of hair style design. In this example, system 100 provides users with simulation-assisted modeling of hair that enables the users to develop a rest pose of a model visually under gravity and other simulated effects. Interactive environment user interface 1500 can be configured to receive input or information from one or more users. Interactive environment user interface 1500 can further be configured to output or communicate information to one or more users. Interactive environment user interface 1500 can allow a modeler to design, sculpt, and create a model and visualize at each change to the model how the model will look when simulated.

In this example, interactive environment user interface 1500 may include panel or window 1510. Panel or window 1510 may represent a view point through which a user can design, sculpt, and interact with a model at the same time viewing the results of one or more simulations of the model within the same view point. Interactive environment user interface 1500 may also include panel or window 1520. Panel or window 1520 may include functionality, tools, options, controls, or the like, for creating, designing, sculpting model 1540, e.g., a solid model, a curve model, or the like, within interactive environment user interface 1500. Interactive environment user interface 1500 may also include panel or window 1530. Panel or window 1530 may include functionality, tools, options, controls, or the like, for controlling one or more simulations of all or part of a model viewed within interactive environment user interface 1500. Interactive environment user interface 1500 can allow users to define a rest pose by specifying a target during simulation.

Figure 16:
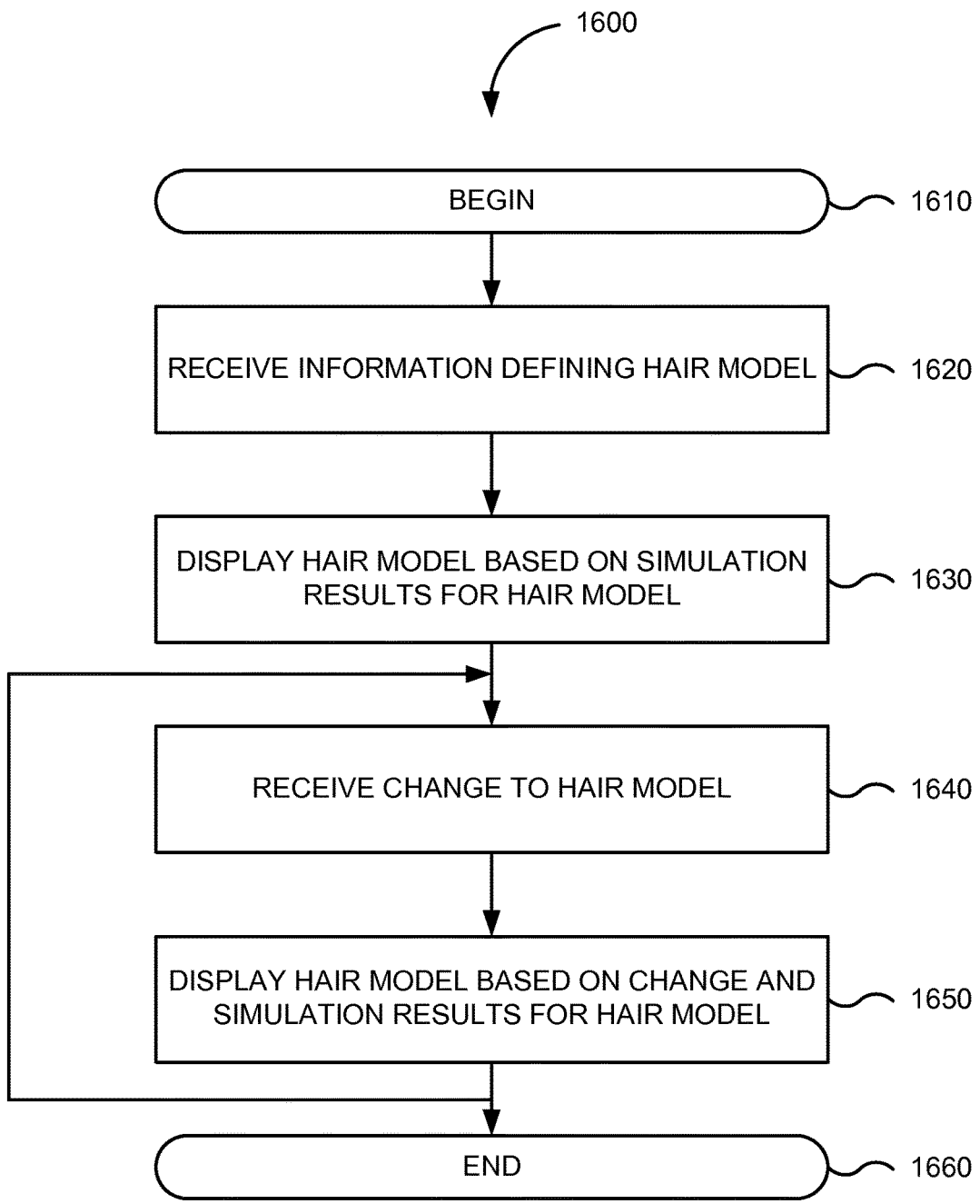
FIG. 16 is a flowchart of a method for simulation-assisted hair modeling within an interactive environment in various embodiments where simulation is an integral part of hair style design.

FIG. 16 is a flowchart of method 1600 for simulation-assisted hair modeling within an interactive environment in various embodiments where simulation is an integral part of hair style design. The processing of method 1600 depicted in FIG. 16 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1600 depicted in FIG. 16 begins in step 1610.

In step 1620, information defining a hair model is received. For example, a user may interact with interactive environment user 1500 to load a predefined model. In another example, a user may interact with interactive environment user 1500 to specify one or more predefined objects, shapes, or the like as a starting point of hair model 1540. The user may use functionality within panel 1520 to provide the information defining hair model 1540. The user may provide material or physical properties of hair model 1540 and give a hair style.

In step 1630, the hair model is displayed based on simulation results for hair model. For example, upon receiving the information defining the hair model in step 1620, design computer 110 may utilize the one or more object simulation systems 160 to obtain simulation results. The rest pose of hair model 1540 may be displayed according to its definition and the simulation results. Accordingly, interactive environment user interface 1500 provides simulation results while the user is defining the rest pose of hair model 1540. This enables the user to see and interact with an actual end simulated result and make any changes within interactive environment user interface 1500 to observe the actual end simulated result.

Therefore, in step 1640, one or more change to the hair model are received. A change may include a change in geometry, a change in one or more material or physical properties, or the like. In step 1650, the hair model is displayed based on the one or more changes and simulation results for hair model. Therefore, the rest pose of hair model 1540 may be developed visually under gravity or other simulated effects. Behavior and response of hair model 1540 during simulation can be visualized for its rest or reference pose in interactive environment user interface 1500.

Figure 17:
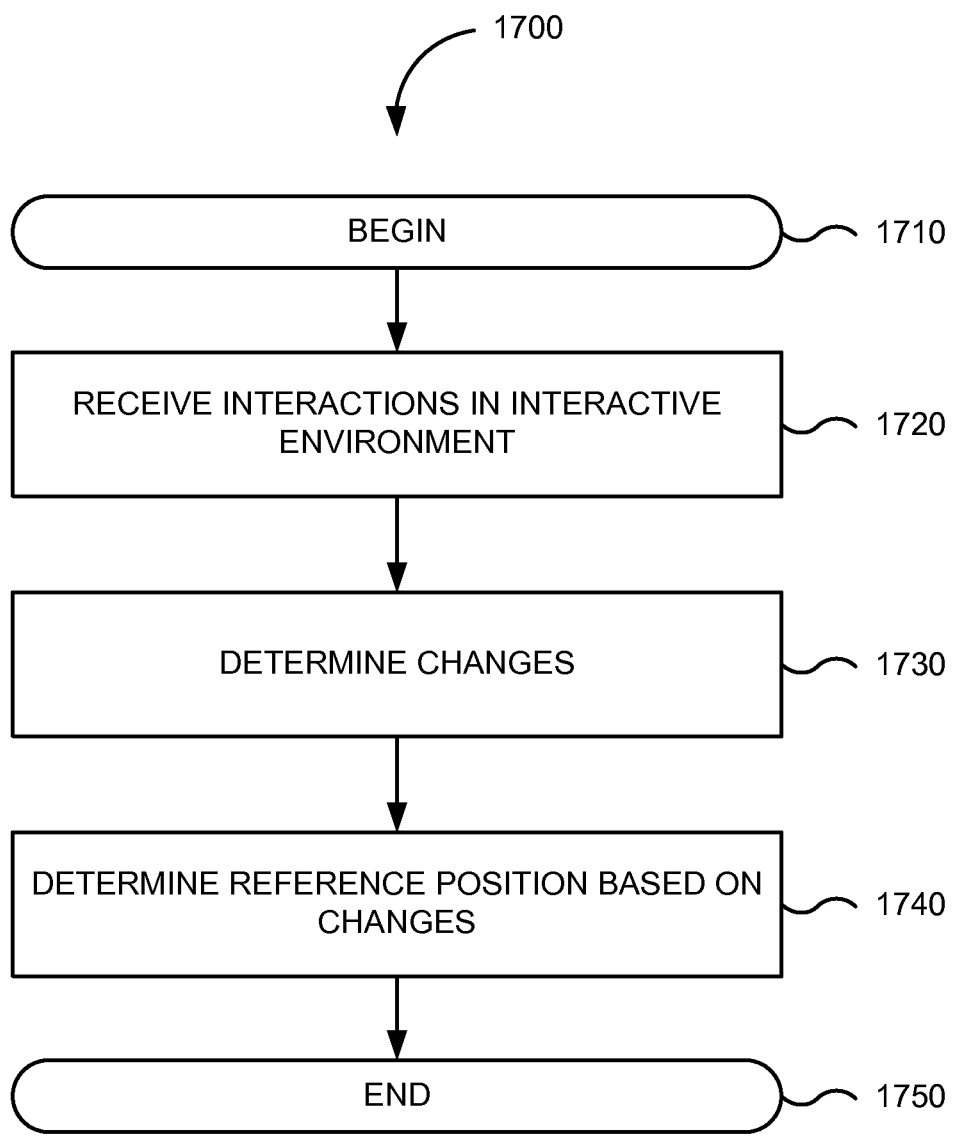
FIG. 17 is a flowchart of a method for determining reference positions in an interactive environment in various embodiments where simulation is an integral part of hair style design.

FIG. 17 is a flowchart of method 1700 for determining reference positions in an interactive environment in various embodiments where simulation is an integral part of hair style design. The processing of method 1700 depicted in FIG. 17 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1700 depicted in FIG. 17 begins in step 1710. In step 1720, one or more interactions are received in the interactive environment. The interactions may include changes to the definition of a model, changes to position of a model, or the like. In step 1730, changes to the model are determined or otherwise identified. In step 1740, a reference position may be determined based on the difference between the changes. The reference position may be used as a target shape or rest pose. FIG. 17 ends in step 1750.

Figure 18:
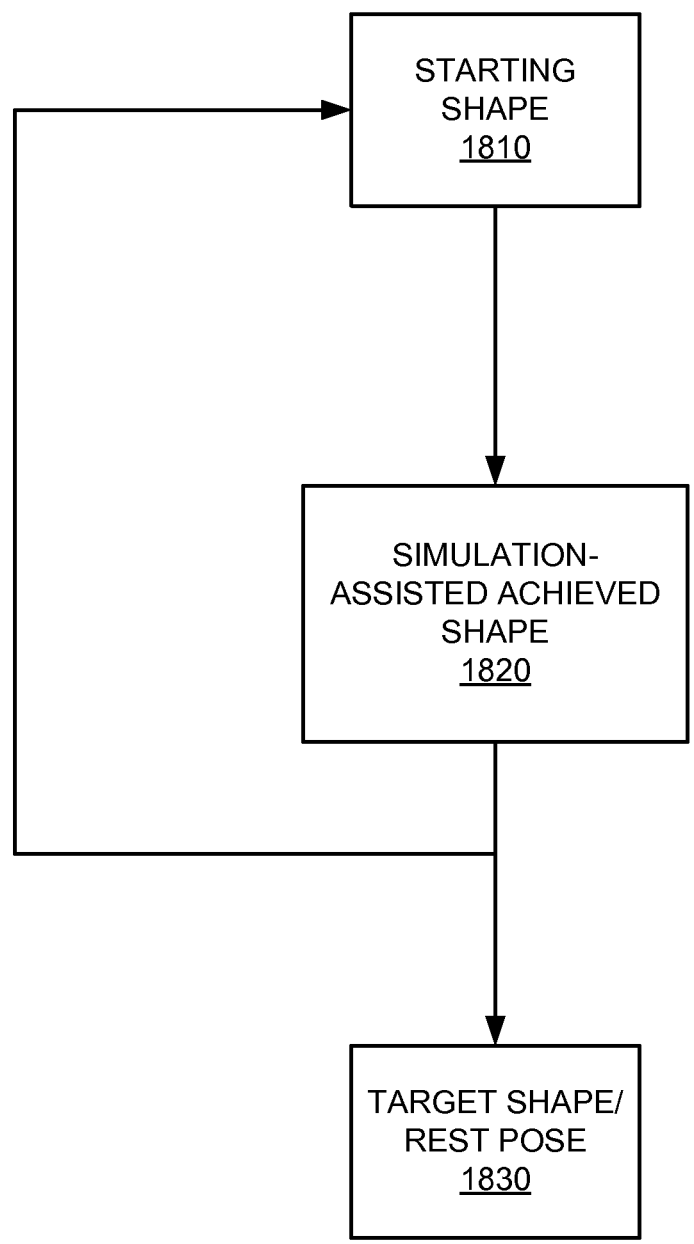
FIG. 18 is a block diagram illustrating shape progression in an interactive environment in various embodiments where simulation is an integral part of hair style design.

FIG. 18 is a block diagram illustrating shape progression in an interactive environment in various embodiments where simulation is an integral part of hair style design. In this example, starting shape 1810 created in interactive environment 1500 may be simulated within interactive environment 1500 to produce simulation-assisted achieved shape 1820. A user may interact with simulation-assisted achieved shape 1820 to achieve a desired look and feel. Simulation-assisted achieved shape 1820 may then be used to determine target shape/rest pose 1830. Information associated with shape 1830 may be used by other processes in a production process. Accordingly, while simulation-assisted achieved shape 1820 may provide the desired look and feel of a shape, target shape/rest pose 1830 may be required for other purposes.

Figure 19:
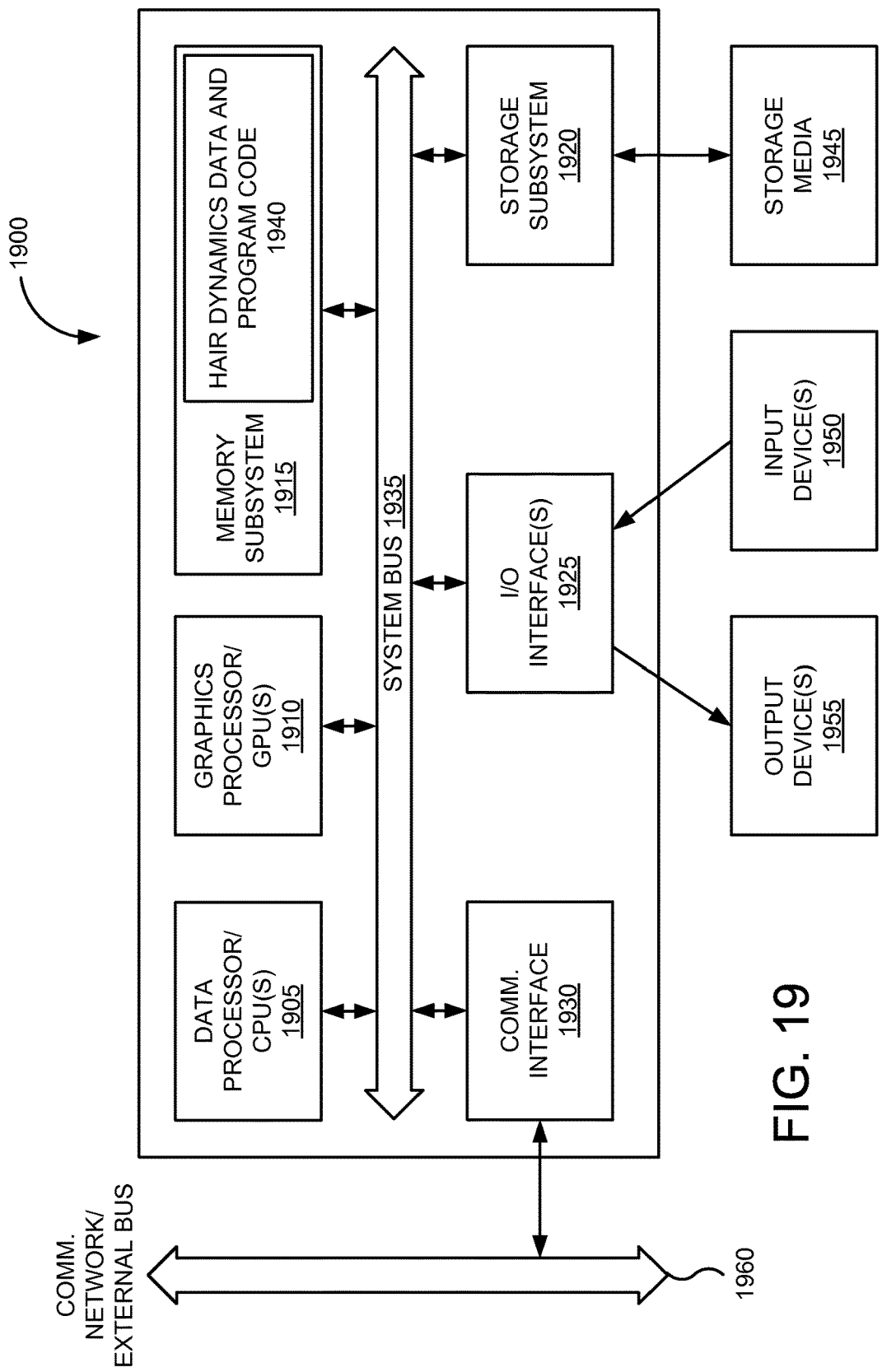
FIG. 19 is a block diagram of a computer system or information processing device that may incorporate an embodiment, be incorporated into an embodiment, or be used to practice any of the innovations, embodiments, and/or examples found within this disclosure.

FIG. 19 is a block diagram of computer system 1900 that may incorporate an embodiment, be incorporated into an embodiment, or be used to practice any of the innovations, embodiments, and/or examples found within this disclosure. FIG. 19 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1900 can include hardware and/or software elements configured for performing logic operations and calculations, input/output operations, machine communications, or the like. Computer system 1900 may include familiar computer components, such as one or more one or more data processors or central processing units (CPUs) 1905, one or more graphics processors or graphical processing units (GPUs) 1910, memory subsystem 1915, storage subsystem 1920, one or more input/output (I/O) interfaces 1925, communications interface 1930, or the like. Computer system 1900 can include system bus 1935 interconnecting the above components and providing functionality, such connectivity and inter-device communication. Computer system 1900 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1905 can include hardware and/or software elements configured for executing logic or program code or for providing application-specific functionality. Some examples of CPU(s) 1905 can include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. CPU(s) 1905 may also include one or more field-gate programmable arrays (FPGAs), application-specific integrated circuits (ASICs), or other microcontrollers. The one or more data processors or central processing units (CPUs) 1905 may include any number of registers, logic units, arithmetic units, caches, memory interfaces, or the like. The one or more data processors or central processing units (CPUs) 1905 may further be integrated, irremovably or moveably, into one or more motherboards or daughter boards.

The one or more graphics processor or graphical processing units (GPUs) 1910 can include hardware and/or software elements configured for executing logic or program code associated with graphics or for providing graphics-specific functionality. GPUs 1910 may include any conventional graphics processing unit, such as those provided by conventional video cards. Some examples of GPUs are commercially available from NVIDIA, ATI, and other vendors. In various embodiments, GPUs 1910 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1910 may include any number of registers, logic units, arithmetic units, caches, memory interfaces, or the like. The one or more data processors or central processing units (CPUs) 1905 may further be integrated, irremovably or moveably, into one or more motherboards or daughter boards that include dedicated video memories, frame buffers, or the like.

Memory subsystem 1915 can include hardware and/or software elements configured for storing information. Memory subsystem 1915 may store information using machine-readable articles, information storage devices, or computer-readable storage media. Some examples of these articles used by memory subsystem 1970 can include random access memories (RAM), read-only-memories (ROMS), volatile memories, non-volatile memories, and other semiconductor memories. In various embodiments, memory subsystem 1915 can include hair dynamics data and program code 1940.

Storage subsystem 1920 can include hardware and/or software elements configured for storing information. Storage subsystem 1920 may store information using machine-readable articles, information storage devices, or computer-readable storage media. Storage subsystem 1920 may store information using storage media 1945. Some examples of storage media 1945 used by storage subsystem 1920 can include floppy disks, hard disks, optical storage media such as CD-ROMS, DVDs and bar codes, removable storage devices, networked storage devices, or the like. In some embodiments, all or part of hair dynamics data and program code 1940 may be stored using storage subsystem 1920.

In various embodiments, computer system 1900 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system. Computer system 1900 may also include one or more applications configured to executed, perform, or otherwise implement techniques disclosed herein. These applications may be embodied as hair dynamics data and program code 1940. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1915 and/or storage subsystem 1920.

The one or more input/output (I/O) interfaces 1925 can include hardware and/or software elements configured for performing I/O operations. One or more input devices 1950 and/or one or more output devices 1955 may be communicatively coupled to the one or more I/O interfaces 1925.

The one or more input devices 1950 can include hardware and/or software elements configured for receiving information from one or more sources for computer system 1900. Some examples of the one or more input devices 1950 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1950 may allow a user of computer system 1900 to interact with one or more non-graphical or graphical user interfaces to enter a comment, select objects, icons, text, user interface widgets, or other user interface elements that appear on a monitor/display device via a command, a click of a button, or the like.

The one or more output devices 1955 can include hardware and/or software elements configured for outputting information to one or more destinations for computer system 1900. Some examples of the one or more output devices 1955 can include a printer, a fax, a feedback device for a mouse or joystick, external storage systems, a monitor or other display device, a communications interface appropriately configured as a transceiver, or the like. The one or more output devices 1955 may allow a user of computer system 1900 to view objects, icons, text, user interface widgets, or other user interface elements.

A display device or monitor may be used with computer system 1900 and can include hardware and/or software elements configured for displaying information. Some examples include familiar display devices, such as a television monitor, a cathode ray tube (CRT), a liquid crystal display (LCD), or the like.

Communications interface 1930 can include hardware and/or software elements configured for performing communications operations, including sending and receiving data. Some examples of communications interface 1930 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1930 may be coupled to communications network/external bus 1980, such as a computer network, to a FireWire bus, a USB hub, or the like. In other embodiments, communications interface 1930 may be physically integrated as hardware on a motherboard or daughter board of computer system 1900, may be implemented as a software program, or the like, or may be implemented as a combination thereof.

In various embodiments, computer system 1900 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1900.

As suggested, FIG. 19 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for simulating hair of a character, the method comprising:
    receiving, at a computer, a reference pose for each hair strand of a plurality of hair strands, wherein the plurality of hair strands are included in the hair of the character, and wherein a hair strand of the plurality of hair strands has a portion with a fixed position relative to the character;
    for each hair strand of the plurality of hair strands, determining, by a processor of the computer, interaction eligibility indicating a likelihood of an interaction between a portion with a fixed position relative to the character of the hair strand with a portion with a fixed position relative to the character of one or more other hair strands of the plurality of hair strands;
    partitioning, by the processor, the plurality of hair strands into a plurality of groups according to the determined interaction eligibility; and
    assigning the plurality of groups to nodes in a distributed computing environment, wherein each node simulates hair strands assigned to the node.

2. The method of claim 1 wherein determining the interaction eligibility includes determining a positional difference between a reference pose of a first hair strand of the plurality of hair strands and a reference pose of a second hair strand of the plurality of hair strands.

3. The method of claim 1 wherein determining the interaction eligibility includes determining a physical relationship between a reference pose of a first hair strand of the plurality of hair strands and a reference pose of a second hair strand of the plurality of hair strands.

4. The method of claim 1 wherein determining the interaction eligibility includes determining a proximity difference between a reference pose of a first hair strand of the plurality of hair strands and a reference pose of a second hair strand of the plurality of hair strands.

5. The method of claim 1 wherein determining the interaction eligibility includes determining a likelihood that a first hair strand of the plurality of hair strands will interact with a second hair strand of the plurality of hair strands.

6. The method of claim 1 wherein determining the interaction eligibility includes detecting collisions between a first hair strand of the plurality of hair strands and a second hair strand of the plurality of hair strands.

7. The method of claim 1 wherein assigning the plurality of groups to nodes in the distributed computing environment includes:
    generating, by the processor, information specifying processor assignments in the distributed computing environment.

8. The method of claim 1 wherein the nodes include a first node and a second node, wherein the groups include a first group and a second group, wherein the first group is assigned to the first node, and wherein the second group is assigned to the second node.

9. The method of claim 1 wherein the portion for a hair strand is where the hair strand attaches to the character.

10. A non-transitory computer-readable medium storing a computer program that when executed by a processor of a computer cause the processor to:
- receive information specifying a reference pose for each hair strand of a plurality of hair strands, wherein the plurality of hair strands are included in hair of a character, and wherein each hair strand of the plurality of hair strands has a portion with a fixed position relative to the character;
- determine interaction eligibility indicating a likelihood of an interaction between the portion with the fixed position for each reference pose of the plurality of hair strands; and
- store information indicative of the interaction eligibility in a storage device associated with the computer.

11. The non-transitory computer-readable medium of claim 10 wherein determining the interaction eligibility includes determining a positional difference between a reference pose of a first hair strand and a reference pose of a second hair strand.

12. The non-transitory computer-readable medium of claim 10 wherein determining the interaction eligibility includes determining a physical relationship between a reference pose of a first hair strand and a reference pose of a second hair strand.

13. The non-transitory computer-readable medium of claim 10 wherein determining the interaction eligibility includes determining a proximity difference between a reference pose of a first hair strand and a reference pose of a second hair strand.

14. The non-transitory computer-readable medium of claim 10 wherein determining the interaction eligibility includes determining a likelihood that a first hair strand will interact with a second hair strand.

15. The non-transitory computer-readable medium of claim 10 wherein determining the interaction eligibility includes detecting collisions between a first hair strand and a second hair strand.

16. The non-transitory computer-readable medium of claim 10, further comprising:
- partitioning, by the processor, the plurality of hair strands into a plurality of groups according to the determined interaction eligibility; and
- generating, by the processor, information assigning each group in the plurality of groups to a node in a distributed computing environment.

17. A distributed computing system for simulating hair of a character, the system comprising:
- a plurality of processing nodes; and
- a management node having a processor and a memory, the memory storing a set of instructions that when executed by the processor cause the processor to:
  - receive a reference pose for each hair strand of a plurality of hair strands, wherein the plurality of hair strands are included in the hair of the character, and wherein each hair strand of the plurality of hair strands has a portion with a fixed position relative to the character;
  - determine interaction eligibility indicating a likelihood of an interaction between the portion with the fixed position for each reference pose of the plurality of hair strands;
  - partition the plurality of hair strands into a plurality of groups according to the determined interaction eligibility; and
  - assign the plurality of groups to the plurality of processing nodes, wherein each processing node simulates hair strands assigned to the processing node.

18. The distributed computing system of claim 17 wherein determining the interaction eligibility includes determining a positional difference between a reference pose of a first hair strand of the plurality of hair strands and a reference pose of a second hair strand of the plurality of hair strands.

19. The distributed computing system of claim 17 wherein determining the interaction eligibility includes determining a physical relationship between a reference pose of a first hair strand of the plurality of hair strands and a reference pose of a second hair strand of the plurality of hair strands.

20. The distributed computing system of claim 17 wherein determining the interaction eligibility includes determining a proximity difference between a reference pose of a first hair strand of the plurality of hair strands and a reference pose of a second hair strand of the plurality of hair strands.

* * * * *